United States Patent
Besley et al.

(10) Patent No.: US 10,839,594 B2
(45) Date of Patent: Nov. 17, 2020

(54) METHOD, SYSTEM AND APPARATUS FOR CAPTURE OF IMAGE DATA FOR FREE VIEWPOINT VIDEO

(71) Applicant: CANON KABUSHIKI KAISHA, Tokyo (JP)

(72) Inventors: James Austin Besley, Killara (AU); Paul William Morrison, Erskine Park (AU)

(73) Assignee: Canon Kabushiki Kaisha, Tokyo (JP)

(*) Notice: Subject to any disclaimer, the term of this patent is extended or adjusted under 35 U.S.C. 154(b) by 9 days.

(21) Appl. No.: 16/216,040

(22) Filed: Dec. 11, 2018

(65) Prior Publication Data
US 2020/0184710 A1 Jun. 11, 2020

(51) Int. Cl.
G06T 15/20 (2011.01)
G06T 19/00 (2011.01)

(52) U.S. Cl.
CPC ............ G06T 15/205 (2013.01); G06T 19/00 (2013.01)

(58) Field of Classification Search
CPC .............................. G06T 15/205; G06T 19/00
See application file for complete search history.

(56) References Cited

U.S. PATENT DOCUMENTS

| 8,290,294 | B2 | 10/2012 | Kopf et al. |
| 8,896,629 | B2 | 11/2014 | Meier et al. |
| 8,953,905 | B2 | 2/2015 | Sandrew et al. |
| 2010/0066732 | A1* | 3/2010 | Kopf ............... G06T 15/20 345/419 |
| 2015/0269785 | A1* | 9/2015 | Bell ............... G06T 19/003 345/427 |
| 2017/0287196 | A1 | 10/2017 | Raeburn et al. |
| 2019/0364265 | A1 | 11/2019 | Matsunobu |
| 2020/0035019 | A1* | 1/2020 | Cappello ............ G06T 7/70 |

FOREIGN PATENT DOCUMENTS

WO 2018147329 A1 8/2018

OTHER PUBLICATIONS

Runde Li; Single Image Dehazing via Conditional Generative Adversarial Network; Methods 2018, 3, pp. 1-10.
Aijoscha Smolic; 3D Video and Free Viewpoint video—From Capture to Display; Pattern Recognition; pp. 1958-1968; Zurich Switzerland.

(Continued)

*Primary Examiner* — Chong Wu
(74) *Attorney, Agent, or Firm* — Canon U.S.A., Inc. IP Division

(57) ABSTRACT

A system and method of generating a virtual view of a scene captured by a network of cameras. The method comprises simultaneously capturing images of the scene using a plurality of cameras of the network; determining, using the captured images, a model of atmospheric conditions in the scene; and defining a virtual camera relative to the scene. The method further comprises rendering the scene from a viewpoint of the virtual camera by adjusting pixels of the captured images corresponding to the viewpoint, the adjusting based on a three-dimensional model of the scene, locations of the plurality of cameras relative to the scene, the viewpoint of the virtual camera, and the geometric model of atmospheric conditions.

20 Claims, 14 Drawing Sheets

(56) References Cited

OTHER PUBLICATIONS

He Zhang; Densely Connected Pyramid Dehazing Network; Department of Electrical and Computer Engineering Rutgers University; pp. 3194-3203.
Epic Games; Volumetric Fog; https://docs.unrealengine.com/en-us/Engine/Rendering/LightingAndShadows/VolumetricFog.
Yeh, Chia-Hung, et al. "Haze effect removal from image via haze density estimation in optical model" Optics express21.22 (2013): 27127-27141.
Wu, Di, and Qionghai Dai. "Data-driven visibility enhancement using multi-camera system." Enhanced and Synthetic Vision 2010. vol. 7689. International Society for Optics and Photonics, 2010.
Zhuwen Li, et al., Simultaneous Video Defogging and Stereo Reconstruction, 2015 IEEE Conference on Computer Vision and Pattern Recognition (CVPR), Jun. 7, 2015, pp. 4988-4997, XP032793958.
Thomas Wiesemann, et al., Fog Augmentation of Road Images for Performance Analysis of Traffic Sign Detection Algorithms, International Conference of Financial Cryptography and Data Security, Oct. 21, 2016, pp. 685-697, XP047360181.

\* cited by examiner

METHOD, SYSTEM AND APPARATUS FOR CAPTURE OF IMAGE DATA FOR FREE VIEWPOINT VIDEO

FIELD OF INVENTION

The present disclosure relates to the capture and processing of image data from a multi-camera network to generate free viewpoint video.

In particular, the present disclosure relates to a method, system and apparatus for generating an immersive and realistic free viewpoint video of an event affected by atmospheric conditions such as fog, haze, mist or smoke at a high frame rate. The present disclosure also relates to a computer program product including a computer readable medium having recorded thereon a computer program for generating an immersive and realistic free viewpoint video of an event affected by atmospheric conditions such as fog, haze, mist or smoke at a high frame rate.

DESCRIPTION OF BACKGROUND ART

Computer vision systems have been used to generate free viewpoint video (FVV) of objects and activity in a field of view surrounded and captured by a network of cameras. An FVV system may be capable of processing video images in real time and generating virtual video footage of the scene suitable for broadcast with a low latency. Alternatively, the processing may be off-line using post processing for later viewing. Virtual video images may be generated from a variety of viewpoints and orientations that do not correspond to any of the cameras in the network.

Most FVV generation techniques work based on camera images captured by a calibrated camera network. A calibrated camera network is one in which the cameras may be described in terms of a number of parameters. The calibration parameters consist of extrinsic parameters (e.g., orientation and pose) and intrinsic parameters (e.g., focal lengths, principal point offset and axis skew). The parameters may be determined from the analysis of a set of images from the camera network taken at approximately the same time.

There are many different known methods of FVV generation. One class of methods are model-based methods that reconstruct a full 3D geometry of the scene. A second class of methods are depth based methods that use depth estimation then generate FVV from image and depth data. A third class are image-based methods that use some kind of interpolation of image data to form the FVV directly. The required density of sampling of an event by a camera network depends on the FVV generation method, the range of viewpoints that are to be generated, and the desired quality of output. Techniques used to generate a 3D geometry include structure from motion, shape-from-silhouette, visual hull reconstruction, shape from focus or defocus, structure from stereo and depth/disparity estimation algorithms.

Existing systems have been designed to generate FVV when the viewing conditions in the scene are clear. Existing systems assume that the multiple views of the scene content are not affected by fog, haze, mist, smoke or other atmospheric conditions. The assumption is appropriate in normal operating conditions and for indoor systems. However, the assumption may not be appropriate for outdoor events. If the assumption is inappropriate then the FVV generated by the system may have an unrealistic look, and the experience of viewing the FVV may become less convincing and immersive.

SUMMARY

It is an object of the present invention to substantially overcome, or at least ameliorate, one or more disadvantages of existing arrangements.

One aspect of the present disclosure provides a method of generating a virtual view of a scene captured by a network of cameras comprising: simultaneously capturing images of the scene using a plurality of cameras of the network; determining, using the captured images, a model of atmospheric conditions in the scene; defining a virtual camera relative to the scene; and rendering the scene from a viewpoint of the virtual camera by adjusting pixels of the captured images corresponding to the viewpoint, the adjusting based on a three-dimensional model of the scene, locations of the plurality of cameras relative to the scene, the viewpoint of the virtual camera, and the geometric model of atmospheric conditions.

According to some aspects, the method further comprises generating the three-dimensional model of the scene using the captured images.

According to some aspects, the three-dimensional model comprises a number of three-dimensional geometry planes determined based on the virtual viewpoint of the scene.

According to some aspects, rendering the scene comprises removing atmospheric conditions according to a depth map of the captured image, and adding atmospheric conditions according to a depth map of an image captured by the virtual camera using the model of atmospheric conditions.

According to some aspects, rendering the scene comprises removing atmospheric conditions based on the virtual camera viewpoint including less atmospheric conditions than the captured images.

According to some aspects, rendering the scene comprises adding atmospheric conditions based on the virtual camera viewpoint including less atmospheric conditions than the captured images.

According to some aspects, rendering the pixels comprising decreasing visibility of an object in the rendered scene compared to the captured images based on the model of atmospheric conditions.

According to some aspects, rendering the pixels comprising increasing visibility of an object in the rendered scene due to atmospheric conditions compared to the captured images based on the model of atmospheric conditions and the three-dimensional model of the scene.

According to some aspects, each pixel of the rendered scene is selected from an image captured by one of the plurality of cameras.

According to some aspects, a pixel of the rendered scene is selected from an image captured by one the plurality of cameras having a closest distance to a point in the scene captured by a corresponding pixel of the virtual camera.

According to some aspects, a pixel of the rendered scene is selected from the captured images according to a largest dot product of normalised direction vectors of the cameras capturing the scene and the virtual camera.

According to some aspects, a pixel of the rendered scene is selected from one of the captured images based on one of the plurality of cameras that having a highest resolution when projected onto the three-dimensional model of the scene.

According to some aspects, visibility of an object in the virtual viewpoint is modified to compensate for atmospheric conditions using the model.

According to some aspects, the model of atmospheric conditions relates to a model of one of fog, haze, mist cloud, rain, smoke, haar and smog.

Another aspect of the present disclosure provides a method of generating an image to be displayed, the method comprising: inputting a plurality of images capturing a same scene using a network of cameras having multiple viewpoints, the scene including objects, wherein atmospheric conditions of the scene affect visibility of each object in the scene; determining information related to the visibility of the objects due to the atmospheric conditions; and generating an image captured from a virtual viewpoint, the virtual viewpoint being a zoomed-in viewpoint compared to the multiple viewpoints, the image being generated using the plural images and the determined information, the generated image having increased visibility for the objects compared to the plurality of images.

According to some aspects, the image is by adjusting pixels of the captured images corresponding to the viewpoint, the adjusting based on a three-dimensional model of the scene, locations of the cameras, and the determined information.

Another aspect of the present disclosure provides a non-transitory computer readable medium having a computer program stored thereon to implement a method of generating a virtual view of a scene captured by a network of cameras comprising: simultaneously capturing images of the scene using a plurality of cameras of the network; determining, using the captured images, a model of atmospheric conditions in the scene; defining a virtual camera relative to the scene; and rendering the scene from a viewpoint of the virtual camera by adjusting pixels of the captured images corresponding to the viewpoint, the adjusting based on a three-dimensional model of the scene, locations of the plurality of cameras relative to the scene, the viewpoint of the virtual camera, and the geometric model of atmospheric conditions.

Another aspect of the present disclosure provides a system, comprising: a network of cameras positioned to capture images of a scene; a memory; a display and a processor, wherein the processor is configured to execute code stored on the memory for implementing a method comprising: simultaneously capturing images of the scene using a plurality of cameras of the network; determining, using the captured images, a model of atmospheric conditions in the scene; defining a virtual camera relative to the scene; and rendering the scene from a viewpoint of the virtual camera by adjusting pixels of the captured images corresponding to the viewpoint, the adjusting based on a three-dimensional model of the scene, locations of the plurality of cameras relative to the scene, the viewpoint of the virtual camera, and the geometric model of atmospheric conditions.

Another aspect of the present disclosure provides apparatus comprising: a memory; a processor configured to execute code stored on the memory implement a method of generating a virtual view of a scene captured by a network of cameras, the method comprising: receiving images of the scene simultaneously captured using a plurality of cameras of the network; determining, using the captured images, a model of atmospheric conditions in the scene; defining a virtual camera relative to the scene; and rendering the scene from a viewpoint of the virtual camera by adjusting pixels of the captured images corresponding to the viewpoint, the adjusting based on a three-dimensional model of the scene, locations of the plurality of cameras relative to the scene, the viewpoint of the virtual camera, and the geometric model of atmospheric conditions.

Other aspects of the invention are also described.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1:
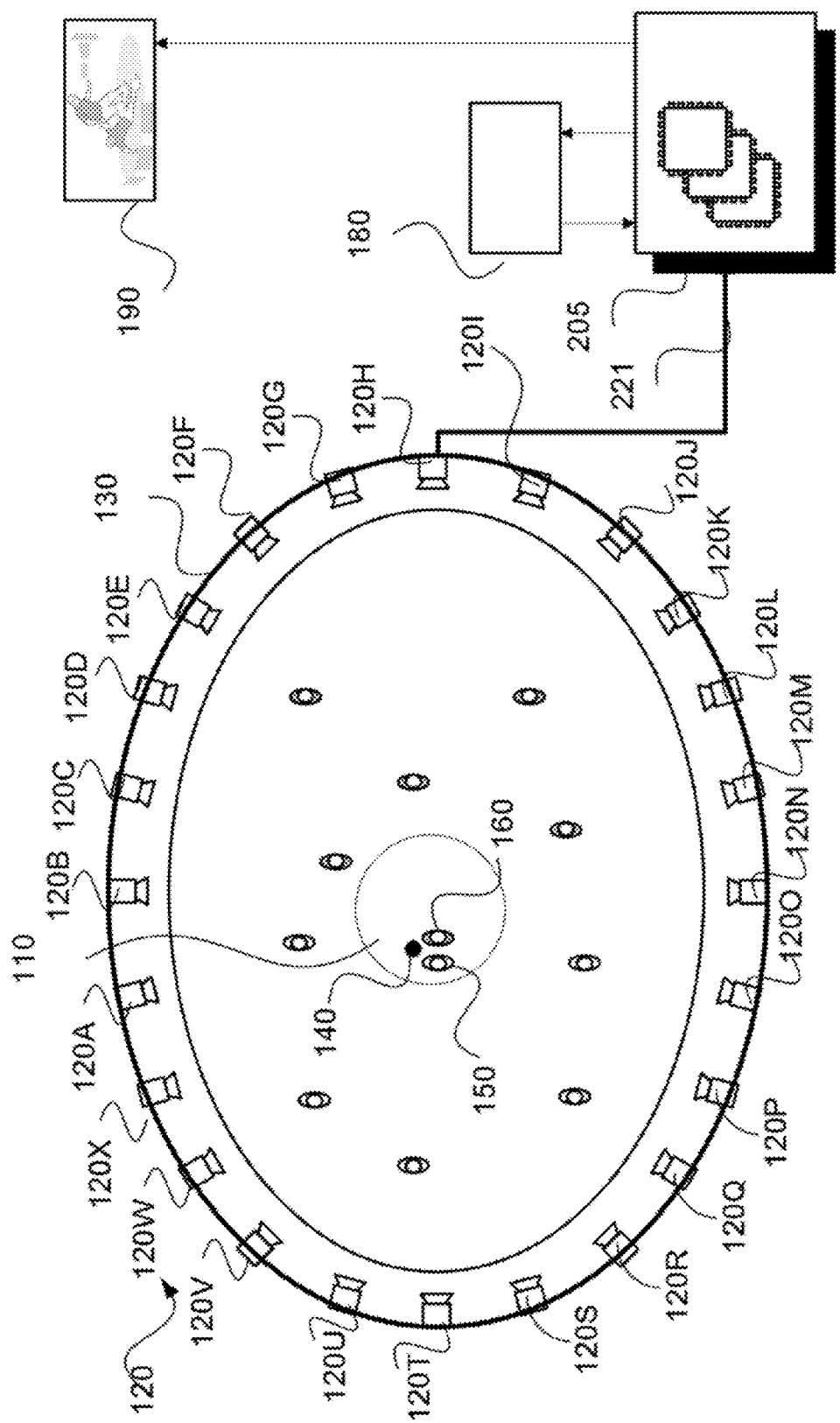
FIG. 1 shows a network of cameras surrounding a region of interest (ROI) or a volume of interest (VOI)

Where reference is made in any one or more of the accompanying drawings to steps and/or features, which have the same reference numerals, those steps and/or features have for the purposes of this description the same function(s) or operation(s), unless the contrary intention appears.

Arrangements described herein may be used with a network 120 of cameras 120A-120X, as shown in FIG. 1, set up around a region of interest (ROI) 110 for live capture and broadcast. The network of cameras 120A to 120X is configured as a ring of cameras 120 in the example of FIG. 1. The cameras 120A to 120X can be any image capture devices suitable for capturing images usable to generate free viewpoint video, and capable of providing captured video to the processing unit 205.

FIG. 1 is shown from above and the marked region of interest (ROI) in this case is an area on the ground surface where objects or players may be located such that they are captured by the camera network 120 and able to be included in synthesised images from virtual viewpoints. In reality, the objects and players are located in a volume above the ground that may be referred to as a volume of interest (VOI). In order to capture images typical activities such as sport, theatre, dance, music, opera or other performances, the volume of interest will typically extend two or more metres above the ground. The VOI may correspond to a fixed region of interest, or may correspond to a moving region of interest. For example, the volume of interest may correspond to a person such as a sports player, an object such as sporting equipment (e.g. a ball) that may be tracked over time.

As described below, the cameras 120A-120X may be part of a large computer vision system used to generate free viewpoint video (FVV). The FVV system may be used to process video in real time and generate virtual video footage of a scene suitable for broadcast with a low latency.

The cameras 120A-120X of FIG. 1A surround the ROI 110 in a single ring of cameras. However, in another arrangement, cameras may surround a ROI in a plurality of rings at different heights.

As seen in FIG. 1, the cameras 120A-120X are evenly spread around the ROI. In another arrangement, there may be a larger density of cameras at particular locations, or the locations of the cameras may be randomly spread. The locations of the cameras may be limited, for example, due to the physical surroundings of the ROI.

In the example arrangement of FIG. 1, the cameras 120A-120X are mounted and fixed. However, in alternative arrangements, the cameras 120A-120X may be capable of pan, tilt and zoom (PTZ) and may be hand held and mobile. In order to produce FVV, stabilised frames may be required from captured video. Alternatively, accurate calibration data associated with each frame may be required. The calibration data may include the effect of any temporal variation in image capture due to the cameras 120A-120X either being controlled (e.g. by an operator or some kind of automated control system) or due to mechanical or optical instability in the cameras 120A-120X. The instability may include vibrations, hand shake, or slow drifts such as are due to environmental changes (e.g., temperature, air pressure, wind, crowd motion, etc). In some configurations the sensor read out may be customised through an extended digital PTZ to achieve efficient image capture for FVV and for frame stabilisation.

In one arrangement, the ROI 110 may be a sports venue, arena or stadium with a large number of cameras (e.g., tens or hundreds of cameras) with fixed pan, tilt, zoom (PTZ) directed in towards a playing area. Such a playing area is typically rectangular, circular or oval, allowing the playing area to be surrounded by one or more rings of cameras so that all points on the playing area are captured simultaneously from a large number of viewpoints. In some arrangements, a full ring of cameras is not employed but rather some subsets of the cameras 120A-120X are used. Arrangements where subsets of the cameras 120A-120X are used may be advantageous when certain viewpoints are known to be unnecessary ahead of time, for example viewpoints that are unlikely to include action or an object of interest.

In one arrangement, the cameras 120A-120X may be synchronised to acquire frames at the same instants in time.

In one arrangement, the cameras 120A-120X may be roughly set up at different heights (e.g. in three (3) rings at different heights) and may focus on specific pre-selected areas of a playing field within the ROI 110. The image features used for stabilisation may be line-like field markings.

Alternatively, the ROI may be a stage at a performance venue. For a stage, a set of cameras (e.g., tens of cameras) may be directed in towards the stage from various directions in front of the performance. In a stage arrangement, challenges may include changing scenery or equipment on the stage. The features for image processing used in such a stage arrangement may be more varied than for a sports venue.

The cameras 120A-120X may be traditional live broadcast types of cameras, digital video cameras, surveillance cameras, or other devices with image capture capability such as a mobile phone, tablet, computer with web-cam, etc. In the described arrangements, the cameras 120A-120X capture high definition (HD) video frames. However, all of the described methods may be adapted to other frame formats such as SD, 4K or 8K.

In the example of FIG. 1, the ROI 110 is an arena 110 having an oval playing field surrounded by the ring of cameras 120. The arena 110, in the example of FIG. 1, contains objects such as players from a first team (e.g. 150) and a second team (e.g. 160) and a ball 140. In the example of FIG. 1, the player 150 may be represented by a first object, the player 160 may be represented by a second object and the ball 140 by a third object.

Figure 2A:
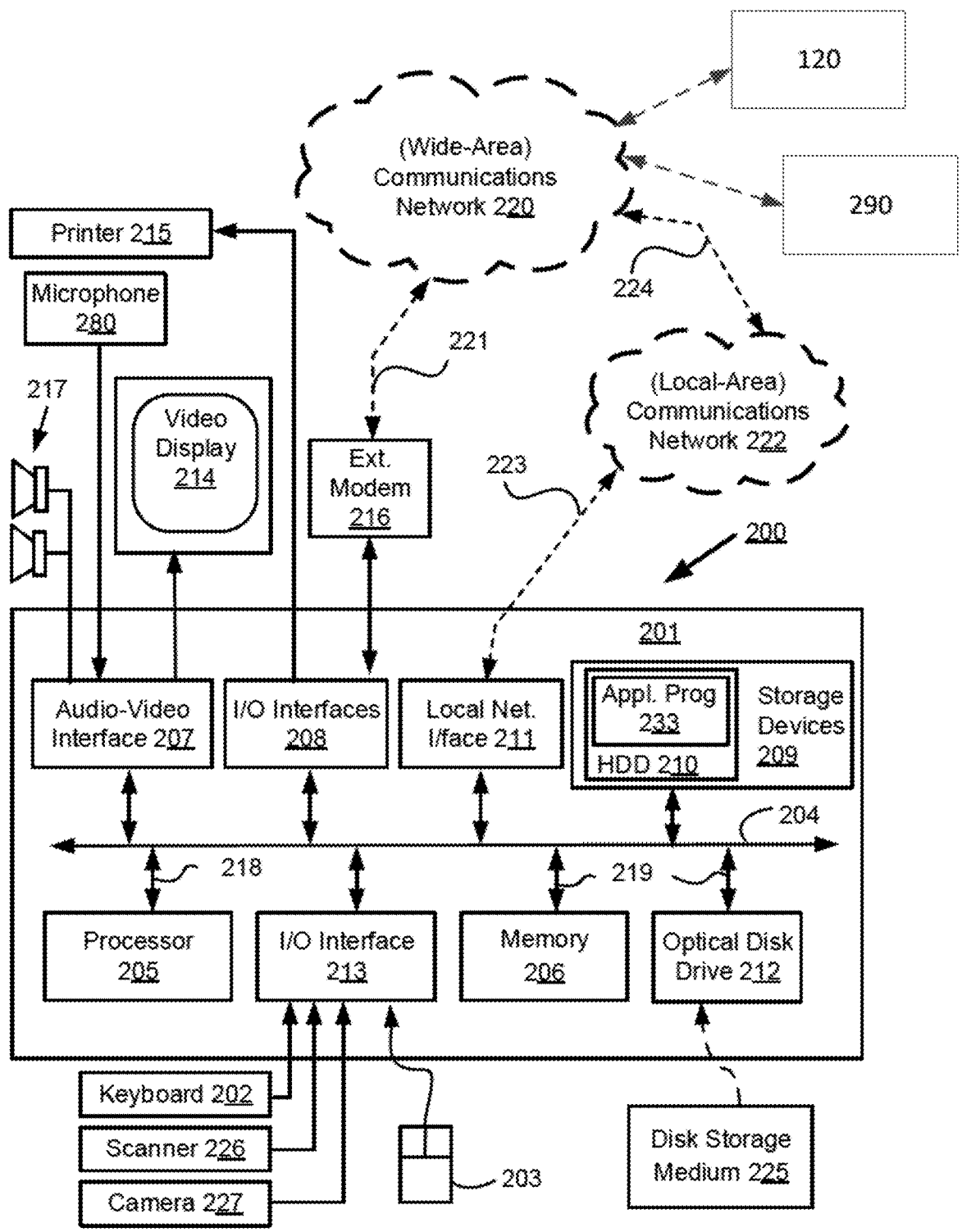
FIGS. 2A and 2B form a schematic block diagram of a general purpose computer system upon which arrangements described can be practiced.

Video frames captured by a camera, such as the camera 120A, are subject to processing and temporary storage near the camera 120A prior to being made available, via a network connection 230, to a processing unit 205 configured for performing video processing. As seen in FIG. 2A, a processing unit 205 is configured within a computer module 201. However, in an alternative arrangement, a separate video processing unit may be used to implement the described arrangements.

The processing unit 205 may perform multiple different operations depending on the controlling input received from a controller 180. For example, the controller 180 may request:

updated camera PTZ settings in order to alter the ROI covered by the camera network 120;

estimation of calibration parameters of the camera network 120 based on a set of image and/or other data from the cameras; generation or update of a model of atmospheric conditions in the scene based on video streams available to the processing unit 205 from the cameras 120A-120X surrounding the arena 110; generation of images from a virtual camera with a specified camera point of view (or viewpoint) 190 defined in terms of camera calibration parameters such as position, orientation, focal length, etc, based on video streams available to the processing unit 205 from the cameras 120A-120X surrounding the arena 110.

Data such as image data, calibration data of the camera network 120, models of atmospheric conditions, etc may be transmitted between the controller 180 and the processing unit 205, for example via a network connection 221.

The virtual camera position input may be generated by a human virtual camera operator and be based on input from a user interface device such as a joystick, mouse 203 (see FIG. 2A) or similar controller including dedicated controllers comprising multiple input components. Alternatively, the camera position may be generated fully automatically based on analysis of game play. Hybrid control configurations are also possible whereby some aspects of the camera positioning are directed by a human operator and others by an automated algorithm. For example, coarse positioning may be performed by a human operator and fine positioning, including stabilisation and path smoothing may be performed by an automated algorithm.

The processing unit 205 may be configured to achieve frame synthesis using any suitable methods of FVV generation. Methods of FVV generation include model-based methods that reconstruct a full 3D geometry of the scene, depth based methods that use depth estimation then generate FVV from image and depth data, and image-based methods that use some kind of interpolation of image data to form the FVV directly. The processing unit 205 may also be configured to provide feedback in the form of the frame quality or the completeness of camera coverage for the requested viewpoint so that a device generating the camera position control signal can be aware of the practical bounds of the processing unit 205. Video streams 190 created by the processing unit 205 may subsequently be provided to a production desk (not depicted) where the video streams 190 may be edited together to form a broadcast video. Alternatively, the video streams may be broadcast unedited or stored for later compilation.

In one arrangement, image stabilisation is performed on a dedicated processing unit connected directly to a camera, such as the camera 120A. However, in other arrangements, analysis may be performed on a server or other non-local processing unit such as the video processing unit 205 described above. The advantage of analysis at or near to the camera 120A is the potential for reduced latency. Detected changes in camera calibration parameters may be used in processing of a video sequence comprising a plurality of images, for example, to transform the video sequence frames to match a reference frame or to update camera calibration parameters used in a computer vision system.

Figure 2B:
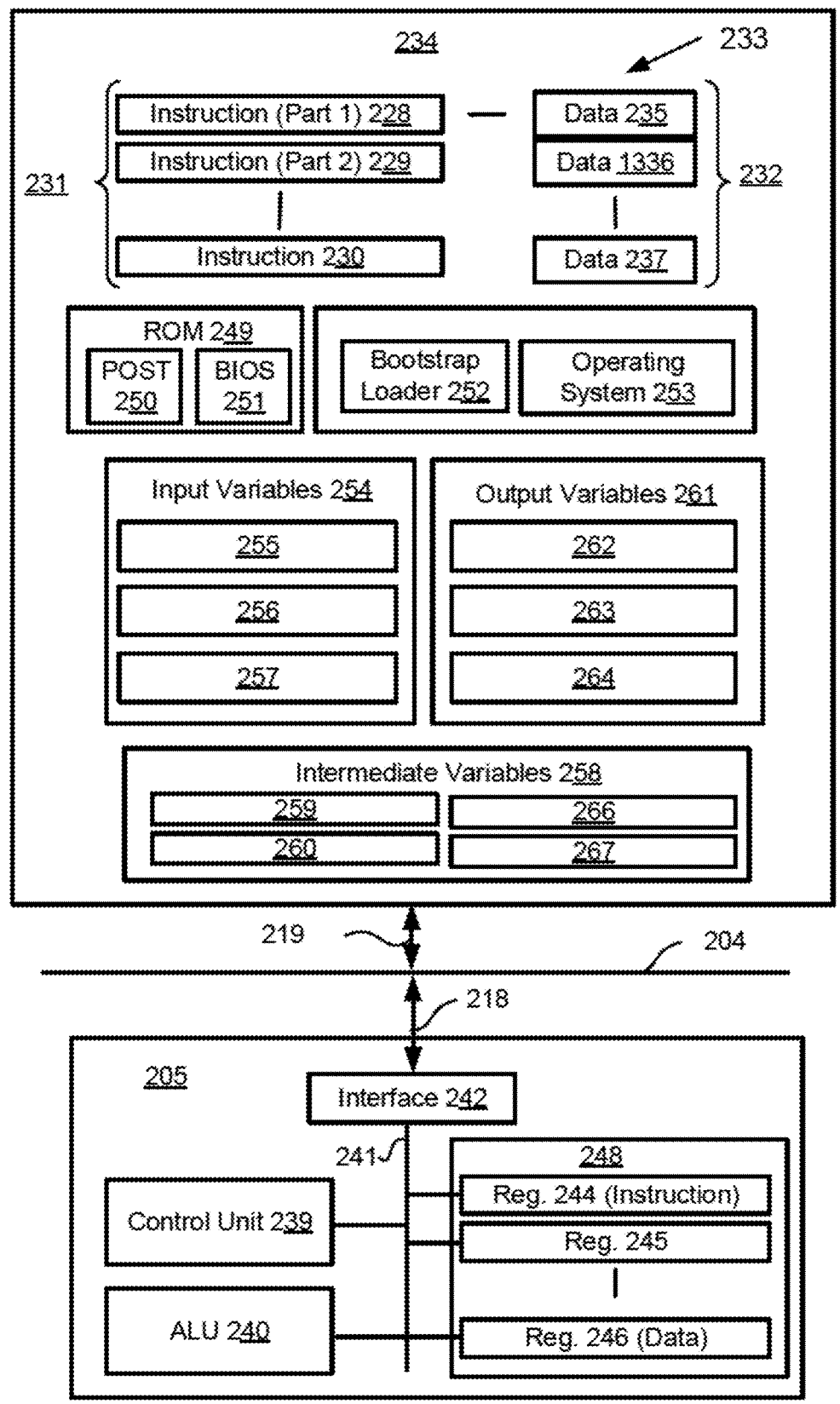

FIGS. 2A and 2B depict a general-purpose computer system 200, upon which the various arrangements described can be practiced. However, the computer system 200 is required to be configured in a particular, technical manner, as described with reference to FIGS. 3 and 8-10 to implement the methods described. The computer system 200, via the application 233 is configured to synthesize free viewpoint video and compensate for atmospheric conditions based on a location of a virtual camera relative to the scene to provide a more realistic virtual view than previous solutions.

As seen in FIG. 2A, the computer system 200 includes: a computer module 201; input devices such as a keyboard 202, a mouse pointer device 203, a scanner 226, a camera 227, and a microphone 280; and output devices including a printer 215, a display device 214 and loudspeakers 217. An external Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The network 120 of cameras can be in communication with the model 201 via the network 220. Alternatively, the module 201 may receive video frames captured by the network 120 from a remote device such as a server 290.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or like computer systems.

The methods of generating virtual views of a scene may be implemented using the computer system 200 wherein the processes of FIGS. 3 and 8-10, to be described, may be implemented as one or more software application programs 233 executable within the computer system 200. In particular, the steps of the methods described herein are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the methods described.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 200 preferably effects an apparatus for implementing the methods described.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The described arrangements use input variables 254, which are stored in the memory 234 in corresponding memory locations 255, 256, 257. The described arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 3 and 8-10 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The methods described may alternatively be implemented in dedicated hardware such as one or more integrated circuits performing the functions or sub functions of FIGS. 3 and 8-10. Such dedicated hardware may include graphic processors, digital signal processors, or one or more microprocessors and associated memories.

FVV may be generated for a passive (constant) scene such as a building or a fixed object using a single camera that is moved in space and captures a sequence of images with different poses and positions. On the other hand, FVV for a dynamic (active) scene such as a sport is generally performed using a network of cameras.

For the dynamic case it is common to use a calibrated network of cameras, that is, a set of cameras for which key parameters have been estimated. The calibration parameters may consist of extrinsic parameters (e.g., orientation and pose) and intrinsic parameters (e.g., focal lengths, principal point offset and axis skew). Techniques for camera network calibration are well known in the art and commercial solutions are available. The techniques may be divided broadly into marker based and markerless techniques depending on whether custom markers are placed in the scene and imaged during calibration.

The calibration parameters of a camera may drift over time, for example due to mechanical, thermal or optical instability in the system. The network calibration may be maintained however either by repeating the calibration process at intervals, or by stabilising the image content from the cameras. For example, real time correction of calibration parameters and/or image content for a single camera can be achieved using a patch based alignment technique. The analysis may be performed on custom hardware on the back of a camera to ensure real time performance. These techniques can be used on a set of cameras in a camera network to ensure that the required accuracy of calibration is maintained over a suitable timeframe for broadcast of an event.

The resolution of the virtual video images generated is limited by the resolution of the captured video from the camera network 120. If the event takes place in a large area then the cameras may be optically zoomed to a particular region of interest in order to allow higher resolution FVV to be generated. For example, in a soccer game the cameras 120A-120X may be zoomed to the penalty area around the goal at one end of the field, in baseball the cameras 120A-120X may be zoomed to one of the bases, or in cricket they may target a region around the wicket. In order to cover multiple areas at high resolution for FVV it may be necessary to use multiple camera networks, each of which covers a particular region of interest, or to move the regions over time to track the interesting activity of the event. The movement of a region of interest may be continuous, for example tracking a player of interest, or discrete, for example a change in region of interest during a break in play.

The network of cameras 120 can be considered to capture images that give coverage of some volume of space for the purpose of FVV. The coverage is the volume in space within which objects may be accurately rendered from a desired range of synthetic viewpoints, and should be greater than the volume of interest (VOI) or set of VOIs. The coverage given by a set of cameras may be a complex function of the set of desired synthetic viewpoints and the geometry of objects. The reason for this dependency is that all parts of objects in the coverage region that are visible from any virtual camera configuration must be imaged by a sufficient number of cameras to allow the virtual view to be synthesised. Some parts of the objects in the VOI may be hard to synthesize due to occlusions, for example due to concavities, even though the objects would be visible from a virtual camera.

Figure 3:
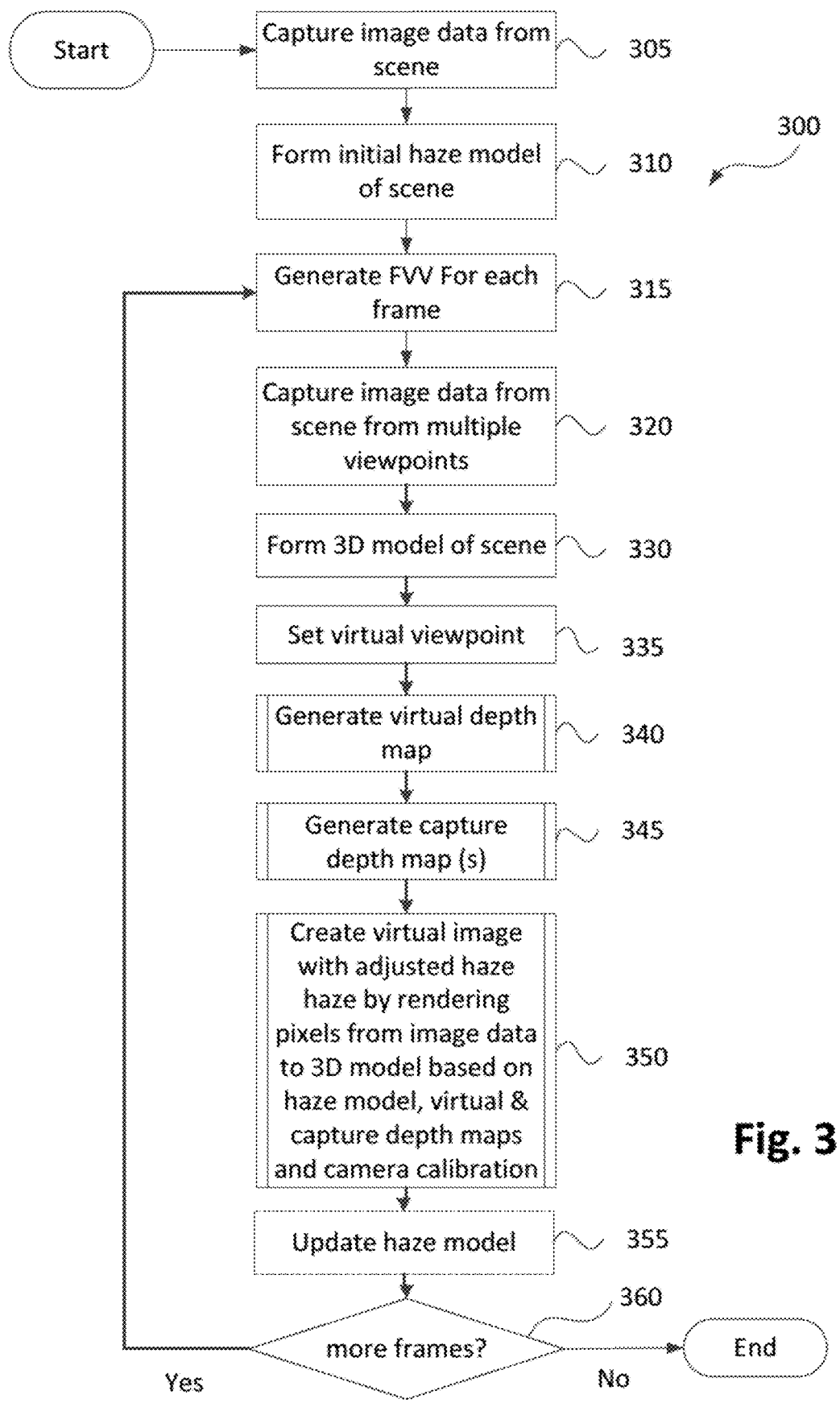
FIG. 3 is a schematic flow diagram showing a method of generating free viewpoint video of a scene in the presence of atmospheric conditions using images captured from multiple viewpoints.

A method 300 of generating immersive and realistic free viewpoint video of an event affected by atmospheric conditions a calibrated network of cameras 120A-X is now described with reference to process 300 of FIG. 3. In the context of the present disclosure, atmospheric conditions relate to conditions affecting visibility of objects in a scene such as fog, haze, mist, cloud, rain, smog, haar or smoke. Examples described in the present disclosure refer to haze. However, the techniques described herein apply equally to mist, fog, smoke and other atmospheric conditions affecting visibility in a scene. The method 300 is suitable for FVV generation based on reconstruction of three-dimensional (3D) geometry. However, the method 300 could be adapted to depth based rendering, for example by converting from depth maps to a 3D geometry description of the scene.

The method 300 is typically implemented as one or more modules of the application 233, stored in the memory 206 and controlled under execution of the processor 205.

Figure 4A:
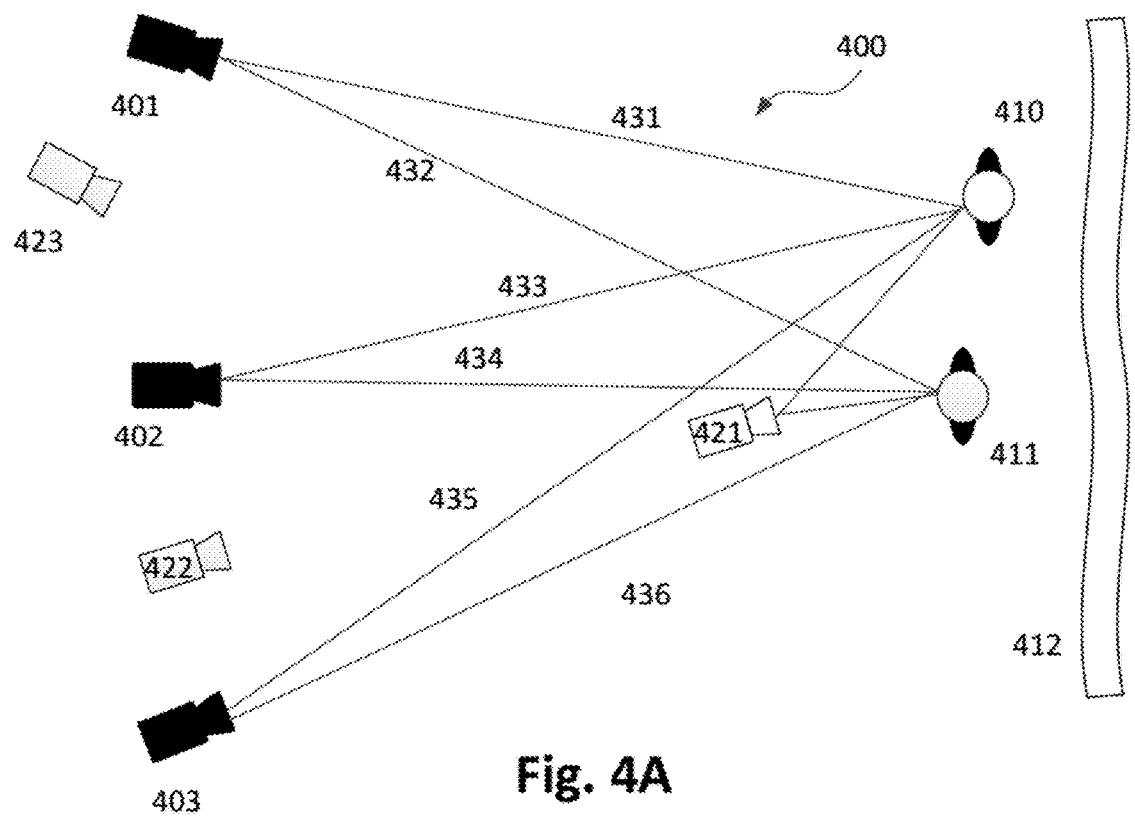
FIGS. 4A and 4B show an example scene, a network of cameras, and a virtual camera viewed from above and from a second perspective respectively.
Figure 4B:
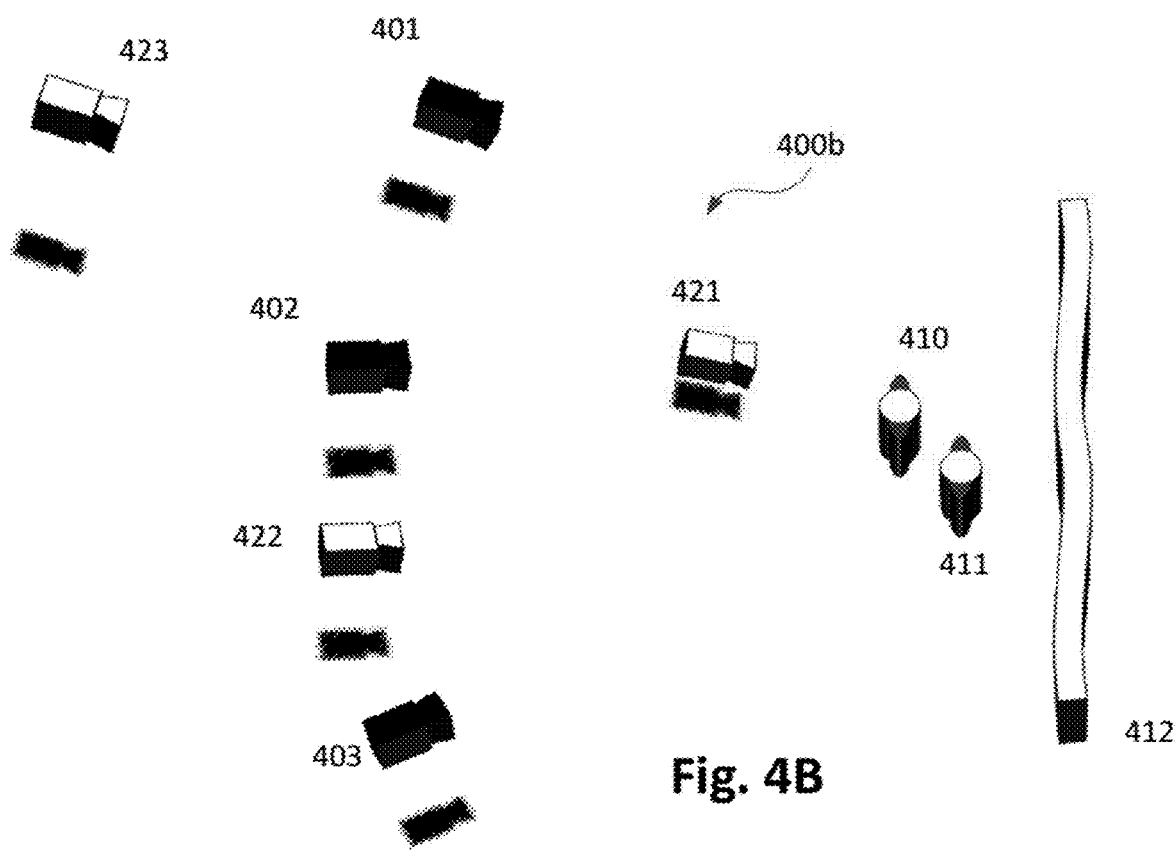

The method 300 is described with reference to FIGS. 4A and 4B. FIGS. 4A and 4B illustrate an example scene captured by a network of cameras (such as the network 120), and a virtual camera respectively. FIG. 4A shows an illustration from above a scene 400 that is captured by an arrangement of a network of physical cameras (401, 402 and 403). The scene 400 corresponds to the scene 110 and the cameras 401 to 403 correspond to cameras of the network 120. The scene 400 includes two marked players 410 and 411 and some other objects 412 that may include foreground and background objects. Three virtual viewpoints or virtual cameras (421, 422 and 423) are also shown for which a frame of a FVV may be generated. As shown in FIG. 4A, the virtual cameras may be closer to the scene 400 (virtual camera 421), further from the scene 400 (virtual camera 423), or a similar distance from the scene 400 (virtual camera 422) than the network of cameras 401-403. In other arrangements the individual network cameras may be set at different distances from the scene 400, though in the example of FIG. 4A the cameras 401 to 403 are shown at a similar distance. A number of rays from the cameras 401 to 403 to the players 410 and 411 are shown in FIG. 4A that will be used to illustrate aspects of method 300 below.

FIG. 4B shows an arrangement 450 having the same sets of cameras 401 to 403, players 410 and 411, objects 412, scene 400b and virtual cameras 421, 422 and 423 as FIG. 4A. However, FIG. 4B is viewed from a perspective to illustrate the three-dimensional nature of the capture geometry. Typically, the network cameras 401 to 403 remain fixed at least for the duration of a particular part of an event for which FVV is being made.

The method 300 begins at a capturing step 305. At step 305 a set of image data is captured for the scene. The image data may be captured by one of the cameras 120A-120X, for a subset of cameras 120A-120X, or for the entire network of cameras 120A-120X. The determination of which cameras to capture images from may be made based on user input or automatically, and may be transmitted from the controller to the camera network. Preferably full camera images are captured. The full images may be compressed or downsampled relative to the full resolution of the camera network to reduce network traffic in transmitting the image data from the cameras to the processing unit 205. In some embodiments the image data may consist of a fraction of the full image capture covered by each camera.

The method 300 continues from step 305 to a generating step 310. Step 310 determines, using the captured images, a model of atmospheric conditions in the scene. The model provides information regarding visibility of object in the scene. At step 310 the controller requests an initial model of the haze, referred to in some instances as a geometric model, to be formed based on the captured image data. A suitable model describes the effect of haze on the captured image by estimating a measured pixel value (i.e. the luminance, or other colour channel value such as R, G, B, U or V) in a scene I based on the scene radiance J (the pixel value in the absence of haze), the global atmospheric light A, and the transmission map t. The measured pixel value relates to luminance or another colour channel value. The pixel value can be determined using Equation (1) below.

$$I = Jt + A(1-t). \quad (1)$$

If the haze is uniform, the transmission map may be expressed using Equation (2) below.

$$t = e^{-\rho d} \quad (2)$$

In Equation (2) ρ is the medium extinction coefficient that defines the uniform haze strength and d is the path length from the object of the scene at the pixel location to the camera. If the haze is non-uniform then t may take a more complicated form such as an integral of the local medium extinction coefficient along the path from the object in the scene to the camera capturing the image. Based on the model of Equation (1) the haze model is defined by the global atmospheric light, A, and the medium extinction coefficient ρ (that may be a constant term or may be defined as a function of the 3D position in the scene). In the arrangements described a constant haze model is formed, however the techniques described herein are applicable to the case of a model that varies with three-dimensional location. As described below with reference to step 350, the haze model is used to estimate the amount of haze between a camera (including the virtual camera), and the three-dimensional objects captured by the camera at every pixel. Therefore, any haze model that can provide an estimate of haze at every pixel can be used in the implementations of the methods described.

A variety of techniques for estimating a haze model (i.e. the parameters A and ρ) are known. The known techniques include single image based techniques, and techniques based on a reference model of the scene. For example, a single image based technique may make use of known scene geometry (e.g. a flat sports field) that is of known appearance (e.g. a substantially uniform green grass) at multiple locations. The single image based technique may search for the haze model parameters (A and ρ) that produce a scene radiance (J) that matches the known uniform appearance at all relevant locations in the image.

Other techniques that use multiple camera images to model atmospheric conditions such as stereo pairs are known. For the calibrated network of cameras 120A-X and an approximate known scene geometry (e.g. a flat sports field) an accurate model of the haze that is consistent with the set of image captures can be generated. For example, a diverse set of positions within the scene geometry (e.g. positions on the sports field) can be mapped to corresponding positions within the image captures of several cameras 120A-120X. An optimisation routine can then be used to find the haze model parameters that produce the same scene radiance (J) at corresponding positions within the image captures.

The method 300 continues from step 310 to a start generating step 315. At steps 315 to 355, FVV is generated for multiple frames captured at a particular time by the camera network 120. The cameras are assumed to be synchronised in time such that each frame is sampled by each camera at or near the same time. Synchronisation of image capture may be achieved using genlock or some other synchronisation technique. In some arrangements the FVV may be generated in response to a request from the controller (for example due a user operating the controller 180).

The method 300 continues from step 315 to a capturing step 320. At step 320, image data captured by and for the set of cameras used to capture the image is read out and transmitted via the network to the module 101. In some embodiments the image data read out may be for a fraction of the pixels of the sensor of a particular camera. In other embodiments the read out may be for selected regions that are expected to include foreground regions such as players or sports equipment, while some background regions may be read out at a lower rate and assumed to be unchanged from previous frames. Other data that may be useful for FVV generation may also be transmitted at step 320 such as segmentation data defining foreground regions.

Figure 5A:
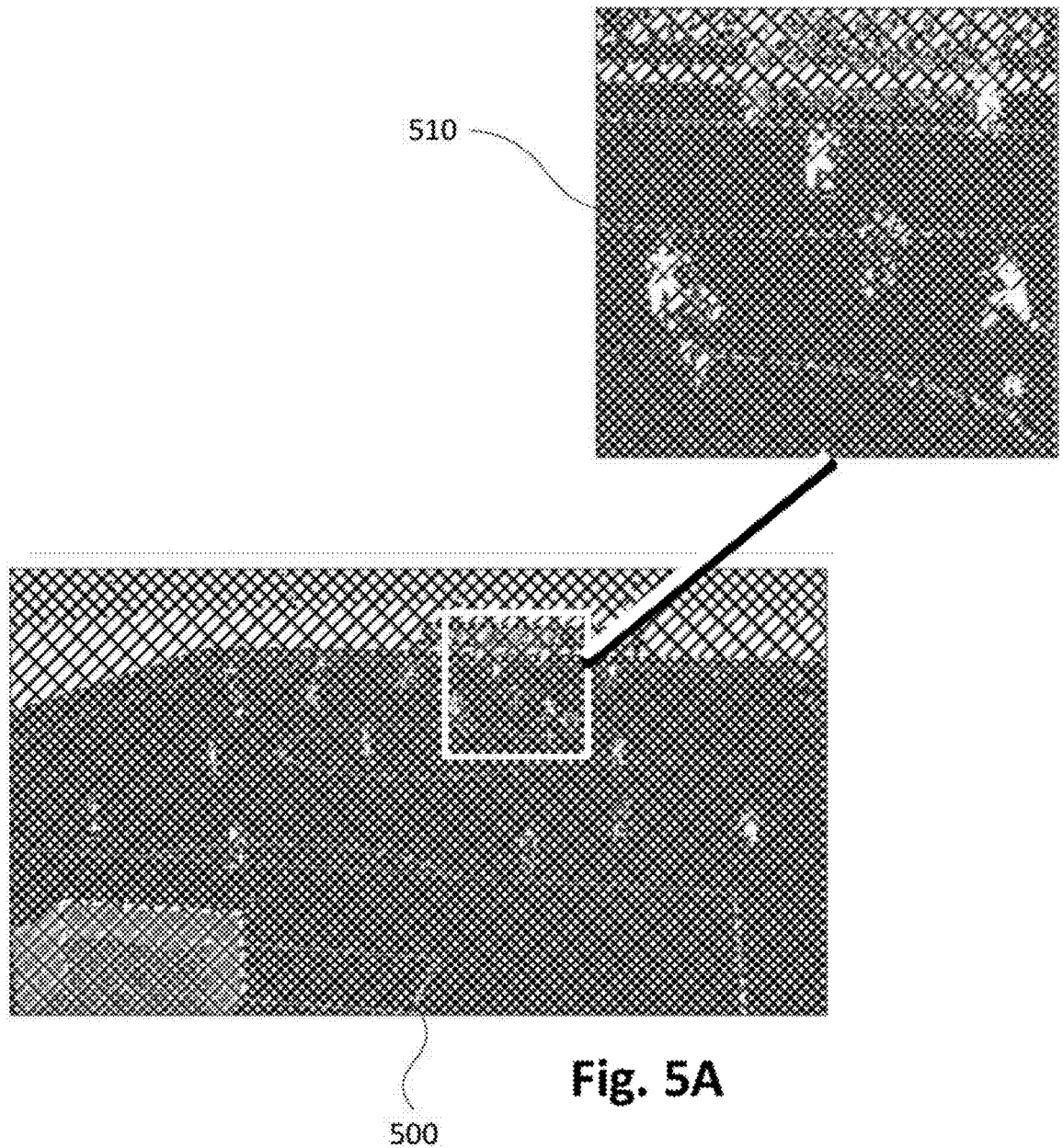
FIGS. 5A and 5B show a captured image of a scene from one of a network of cameras with and without atmospheric conditions such as fog, haze, mist or smoke.
Figure 5B:
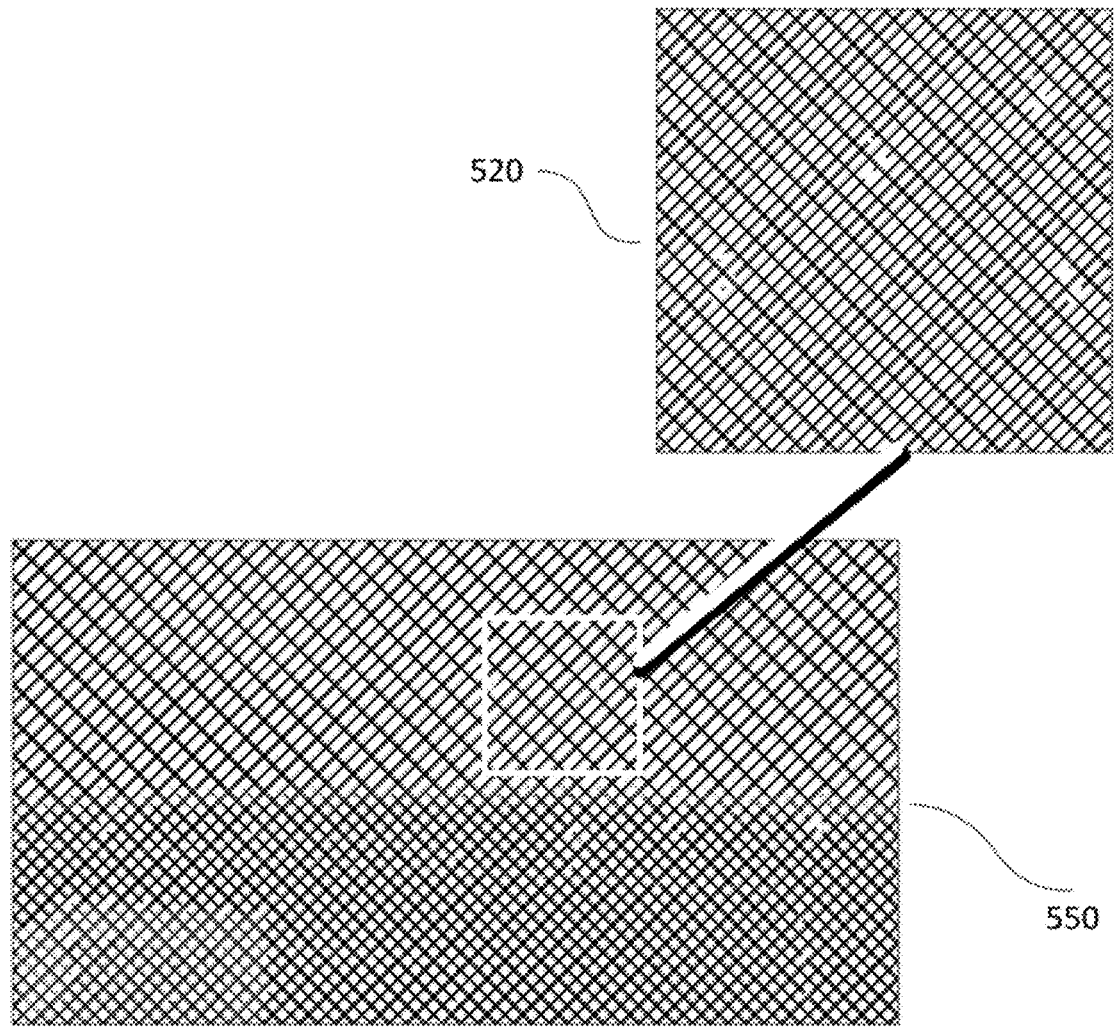

FIG. 5A shows a greyscale example image 500 captured by a camera such as 401, 402 or 403 of FIG. 4A. The image 500 is rendered with line hatching. The scene of the image 500 is a sports event with a number of players and a ball and with no haze present. The players are relatively small in the scene as the camera is set up away from the scene and tilted down (similar to camera 402 of FIG. 4A and 4B). An expanded view of a cropped region from the image of FIG. 5A is shown (510). The expanded view 510 includes several players of interest for a particular FVV rendering of the scene. In a real scene, however, haze may be present and might affect the quality of captured images. FIG. 5B shows the same greyscale image of FIG. 5A affected by haze, shown as image 550. The visibility of features in the field of view drops with distance, such that the players at the far side of the playing field are particularly hard to see. An expanded view of a cropped region from the image of FIG. 5B is shown (520) that illustrates the effect of haze on the captured images further.

The method 300 continues from step 320 to a forming step 330. At step 330 a three-dimensional model or three-dimensional scene geometry of the scene is generated for the scene at the current frame. The three-dimensional model of the scene is typically generated using images captured by the cameras 120A to 120X. Techniques used to generate a three-dimensional model include structure from motion, shape-from-silhouette, visual hull reconstruction, shape from focus or defocus, structure from stereo and depth/ disparity estimation algorithms. A 3D model of the scene can be generated from depth estimates of the scene from one or more cameras that may be either estimated or sampled in the case of a camera with depth capture. In some arrangements the current haze model of the scene and information relating to the scene geometry and camera calibration data may be used to remove the effect of haze from the images prior to forming the 3D model. Using the current haze model may be advantageous in that the generation of a 3D model might be less accurate in the presence of haze. The haze may be removed using the haze model and haze model parameters (A and ρ) estimated at step 310. The arrangements described relate to determining the scene radiance, J. The scene radiance J is the appearance of the scene with the haze removed. By re-arranging haze model equation (1), J can be determined using the following equation:

$$J = \frac{I - A + At}{t}. \qquad (3)$$

Figure 6A:
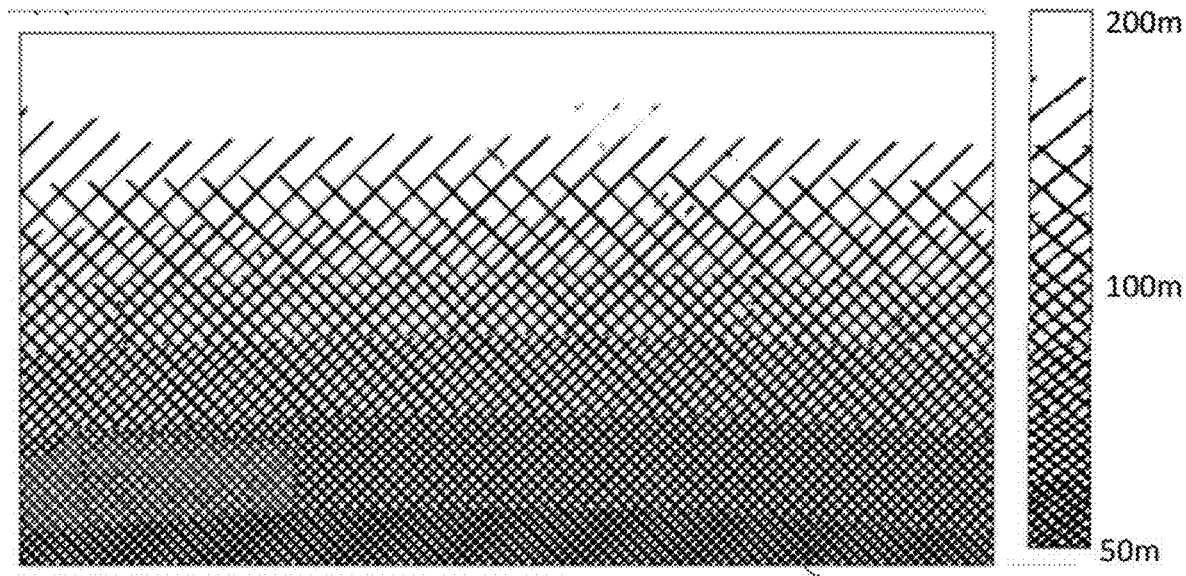
FIGS. 6A to 6C illustrate depth maps associated with a scene captured from both a real camera location and a virtual camera location and a depth map associated with distances from a real camera but for a viewpoint given by a virtual camera.

In Equation (3) the depth, d, used to determine t as shown in Equation (2), can be estimated using the depth map from the previous frame, or a depth map that is based on a known or assumed geometry such as the ground plane. A depth map may be generated for each captured camera image. The depth map includes a depth estimate for each pixel of the captured image that may be determined by comparing the camera location and the position of the point of the 3D geometry of the scene captured at that pixel in the current frame. FIG. 6A illustrates an example depth map 600 corresponding to the illustrated captured images 500 and 550 of FIGS. 5A and 5B. The depths in the scene of the image 500 range from 50 metres to 200 metres in the example of FIG. 6A. Other than the near goalposts, very little of the detailed 3D geometry is visible in the depth map 600. A general trend of increasing distance to the scene for pixels that are further from the bottom of the image is noted, and this increasing distance is the reason for the increased haze in FIG. 5B compared to FIG. 5A. In some arrangements, the step 330 may be omitted in some iterations of the loop between step 315 and step 360, for example if limited action occurs, or if objects in the region of interest of the scene are relatively stationary. In some arrangements, a pre-existing model, for example a model generated at the start of the loop, or several iterations of the loop may be re-used.

The method 300 continues from step 330 to a setting step 335. At step 335 a virtual camera is defined relative to the scene. Accordingly, a virtual viewpoint of the virtual camera for the current frame is set. This viewpoint is received from the controller 180 and may be selected manually or automatically as discussed above. The viewpoint consists of a set of calibration data for a virtual camera that defines the virtual camera's extrinsic parameters (location and orientation) and intrinsic parameters (such as focal length, sensor geometry, principal point, etc).

The method 300 continues from step 335 to a generating step 340. At step 340 a virtual depth map is generated. The virtual depth map corresponds to the pixels of a virtual image of the scene based on the virtual viewpoint at the current frame. The virtual depth map includes a depth estimate for each pixel of the image determined by comparing the virtual camera location and the position of the point of the 3D geometry of the scene imaged at that pixel in the current frame. Step 340 can be performed according to a method 800 to be described in detail with respect to FIG. 8 below. If a non-uniform haze is assumed the determined virtual depth map can additionally include an integrated medium extinction coefficient over the path between the virtual camera and the 3D geometry rather than simply a depth. For example, the haze model may comprise a three-dimensional grid of voxels, where each voxel is associated with an amount of haze or equivalent medium extinction coefficient. The haze model can be integrated over the path between the virtual camera and the 3D geometry, by summing the haze or medium extinction of each voxels between the virtual camera and 3D geometry, for each pixel in the virtual camera. An integrated medium extinction coefficient would be computationally more expensive to generate but would allow the method 300 to handle non-uniform haze in the scene.

Figure 6B:
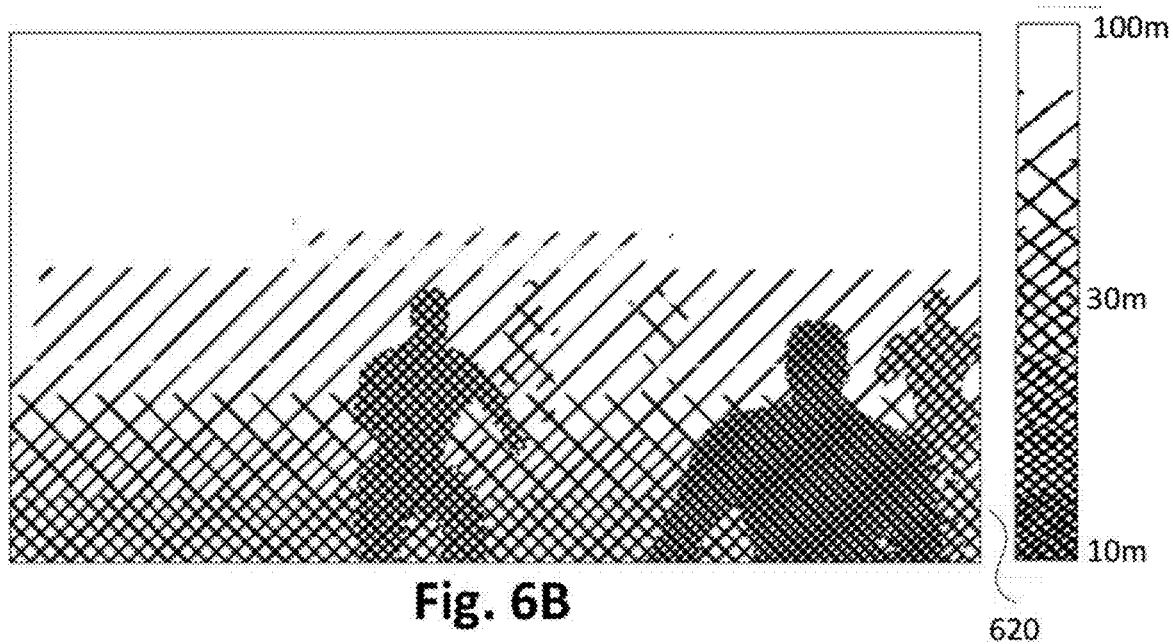

FIG. 6B illustrates a virtual depth map 620 for a portion of the scene of FIG. 5B. In the example of FIG. 6B the virtual camera is close to the players near the edge of the goal area at the far end of the field. The distance to most of the players is less than 40 metres. Many more features are visible in the virtual depth map 620 than were visible in the capture depth map 600 shown in FIG. 6A as the visual effect of the haze or fog varies with distance from the camera.

The method 300 continues from step 340 to a generating step 345. At step 345 one or more capture depth maps are generated. Each capture depth map corresponds to the pixels of a virtual image of the scene based on the virtual viewpoint at the current frame and as captured by one of the physical cameras (120A to 120X or 401 to 403) of the camera network. The capture depth map for a given physical camera includes a depth estimate for each pixel of the virtual image. The depth estimate corresponding to a given pixel of a virtual image of the scene may be calculated by comparing the real camera location and the position of the point of the 3D geometry of the scene imaged at that pixel in the virtual camera. Step 345 can be performed for each camera capture according to the method 800 described in detail with respect to FIG. 8 below. Similarly to step 340, if a non-uniform haze is assumed the determined capture depth maps may include an integrated medium extinction coefficient over the path between the virtual camera and the 3D geometry rather than solely a depth. Accordingly, accounting for non-uniform haze would be computationally more expensive, but would allow the method 300 to handle non-uniform haze in the scene, potentially leading to more accurate or realistic virtual camera images.

Figure 6C:
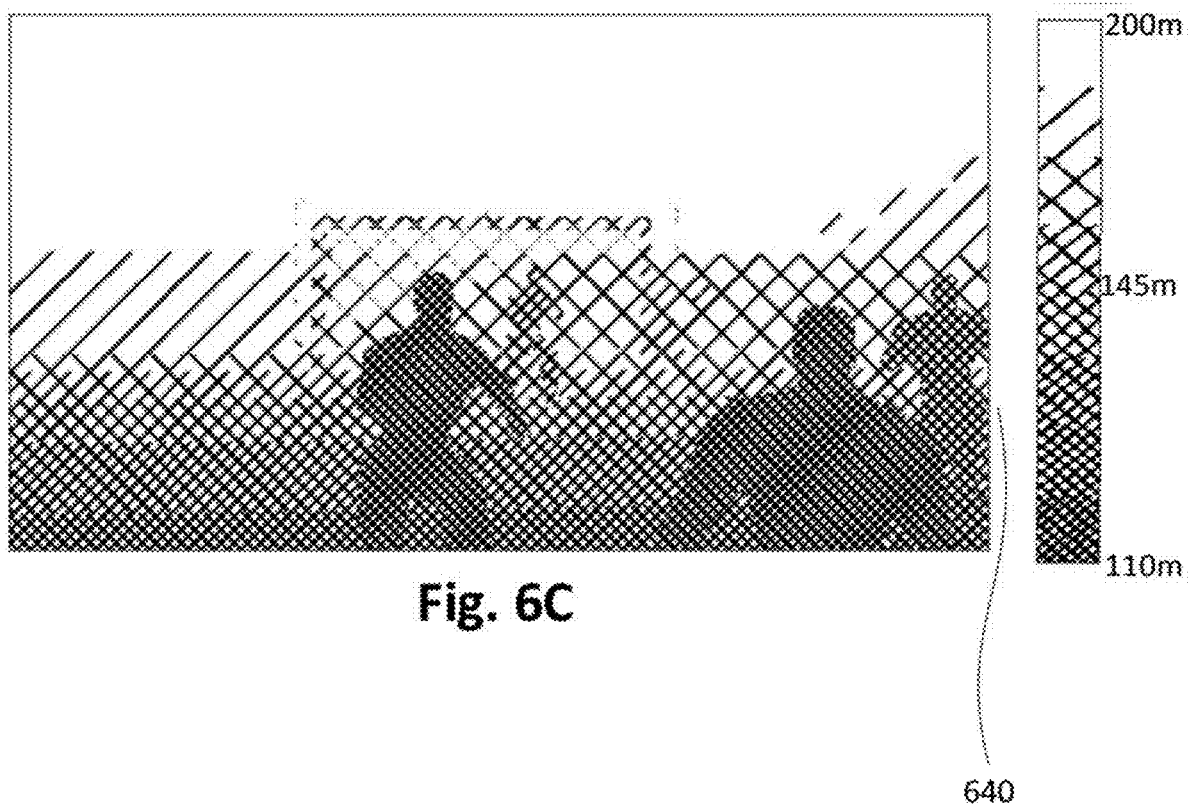

FIG. 6C illustrates a capture depth map 640 for the scene of FIG. 5A. In the example of FIG. 6C the virtual camera is close to the players near the edge of the goal area at the far end of the field while the real camera is further away. Therefore, the field of view of the captured depth map 640 is quite different from the depth map 600 shown in FIG. 6A. The distances to all of the content in the scene is greater than 100 m, and notably the players are at greatly increased distances than in the virtual depth map 620 of FIG. 6B.

The method 300 continues from step 345 to a creating step 350. At step 350 a virtual image or FVV image from the virtual camera is generated with haze by rendering pixels front the image data of one or more captured images onto the 3D model. The pixels from the image data are rendered taking into account the haze model, the virtual depth map, one or more capture depth maps and the camera calibration data. Operation of step 350 effectively involves rendering pixels from captured images onto the 3D model while compensating for the difference in distance through the haze between the captured images and the virtual image. Accordingly, step 350 operates to rendering the scene from the viewpoint of the virtual camera by adjusting pixels of the captured images corresponding to the viewpoint. The adjusting based on the three-dimensional model of the scene of step 330, locations of the plurality of cameras relative to the scene (the depth maps of steps 340 and 345), the viewpoint of the virtual camera, and the geometric model of atmospheric conditions from step 310. The adjusting further based on user instruction indicating a degree of taking into account the haze model for the rendering. Step 350 is described in further detail below with reference to a method 900 of FIG. 9.

Steps 315 to 350 operate to generate the FVV image in a manner intended to improve accuracy and efficiency using on a set of captured camera images. The accuracy of the generated image can be defined in terms of the similarity of the generated virtual camera image to an image generated by a real camera placed in the scene according to the pose and other camera parameters of the virtual camera. By compensating for the difference in haze a virtual camera image can be generated that is visually similar to an image captured from the same viewpoint using a physical camera.

Figure 7A:
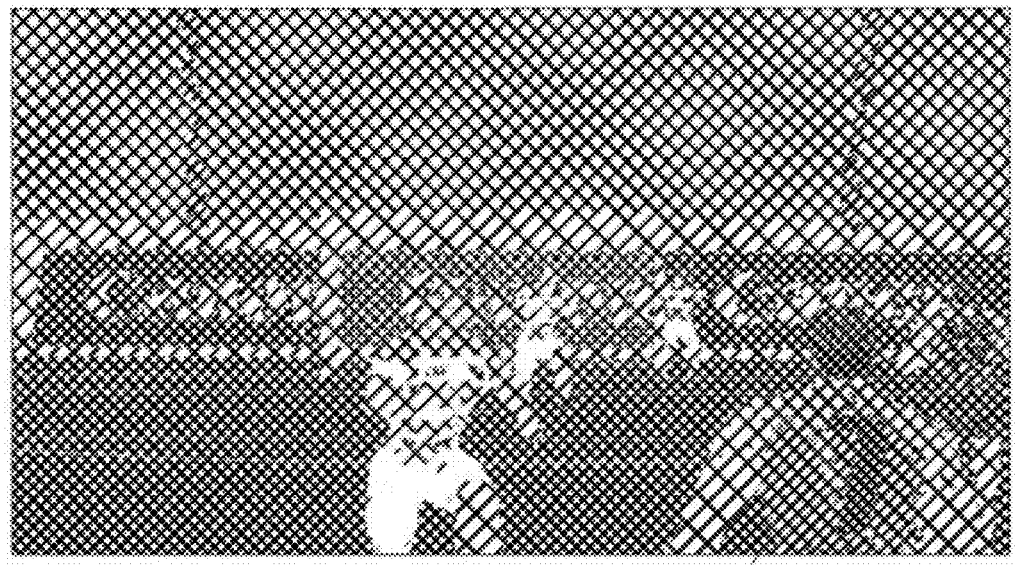
FIG. 7A shows a virtual image of a scene generated for images captured in the absence of haze.
Figure 7B:
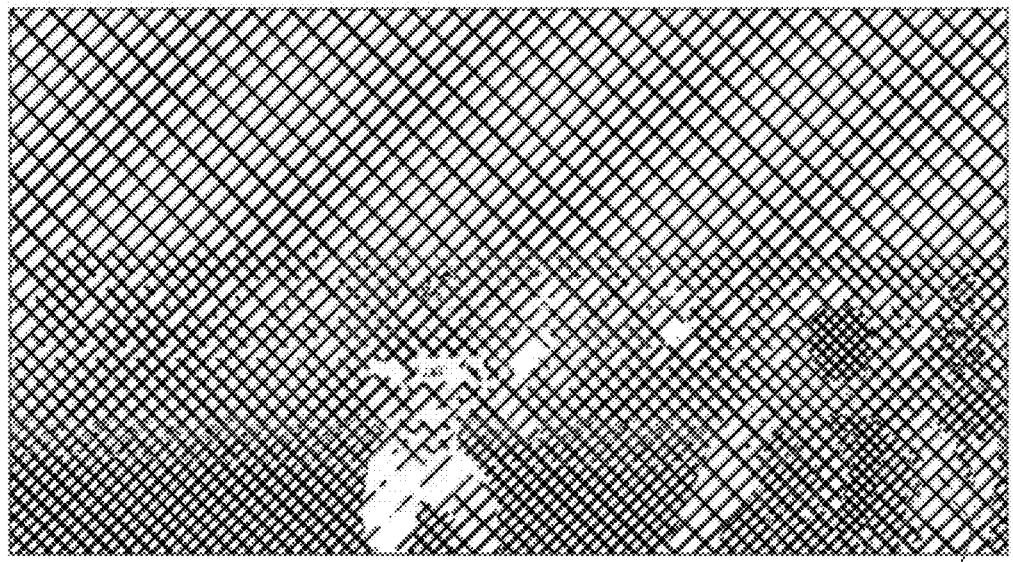
FIGS. 7B and 7C show a virtual image generated from images of the same scene captured in the presence of haze with and without the arrangements described.
Figure 7C:
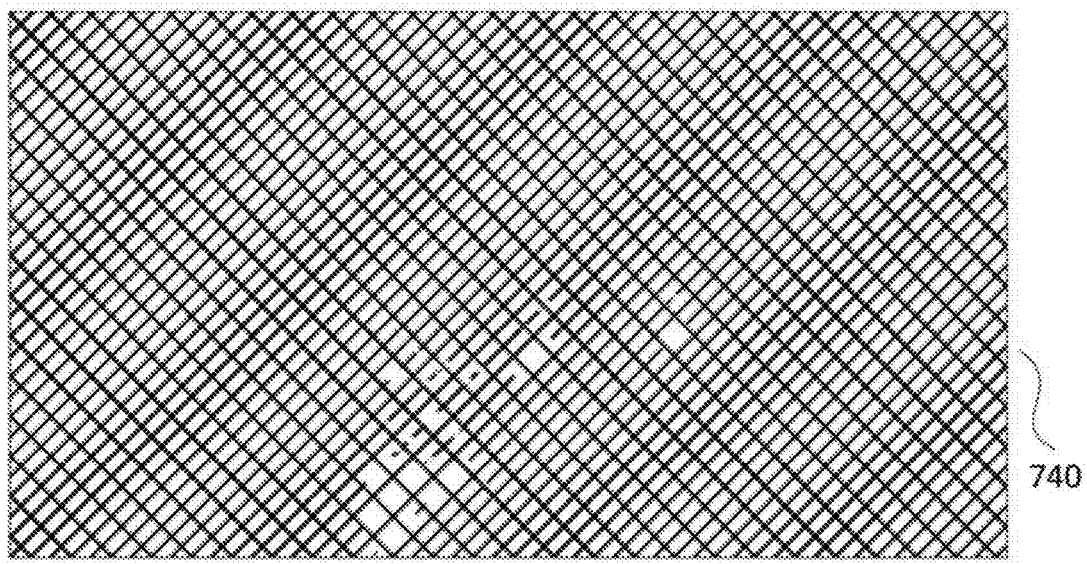

Generated FVV images corresponding to the example discussed with respect to FIGS. 4, 5 and 6 are illustrated in FIGS. 7A to 7C. FIG. 7A shows a greyscale image 700 generated for the virtual camera 421 of FIG. 4A when there is no haze in the scene 400. In this case the FVV is generated from captured images such as the image 500 shown in FIG. 5A.

On the other hand, if there is haze present the captured images may look more like the image 550 illustrated in FIG. 5B. If the haze model is not taken into account at step 350 the generated FVV image will appear to be more heavily affected by haze than the actual scene as illustrated in an example image 740 FIG. 7C. Objects that are at quite different distances from the camera such as the three players with white stripes on their shirts may appear to have similar levels of haze, which looks unrealistic. Objects that are closer to the camera may seem more affected by haze than those at a distance, such as the player on the right with the number 7 shirt (visible in FIG. 7A and 7B but not FIG. 7C). Furthermore, as the virtual camera moves through the scene the haze levels appear constant on objects in the scene, further reducing the realism of the generated images, and making the experience of a viewer watching the virtual video footage less immersive.

FIG. 7B shows an image 720 as would be generated by execution of steps 315 to 350 for images of a scene in haze such as that shown in FIG. 5B. The image 720 has a much higher level of visual realism than FIG. 7C in that nearby objects are much less affected by haze than distant objects, the haze being consistent with the current global model of haze in the scene. Output executed by steps 315 to 350 would also be expected to be consistent as the virtual camera moves through the scene, and there would make a more immersive and realistic experience for a viewer of the FVV.

The method 300 continues from step 350 to an updating step 355. At step 355 the haze model formed above is updated based on recent frame image data captured at step 315. The updating may be performed on a separate processor, for example an auxiliary processor or a server processor (not shown in FIG. 2A), and may take multiple frames to complete. Step 355 can use the techniques described above for step 310 with updated captured images to form a new model. The new model may be used to replace the current model or it may be blended with parameters from the updated model to form a more stable model over time. In some implementations, the step 355 may be omitted, or may be implemented intermittently, for example after a certain number of iterations, at a given time interval, or based on a level of change of parameters. For example, the haze model may be updated every second, or at some other update rate dependent on the type of fog, the weather conditions (such as wind speed) and the like.

The method 300 continues from step 355 to a check step 360. Step 360 which checks if there are more frames of captured video to process to generate free viewpoint video. If there are more frames ("Yes" at step 360) the method 300 returns to step 315. If not, step 360 returns "No". The generated frames are used to reproduce (for example via the display 214) free viewpoint video footage for the user including the compensated fog. Upon reproducing the virtual video frames for the user's viewing the method 300 ends.

Operation of the method 300 therefore operates to generate an image captured from a virtual viewpoint, for example a zoomed-in viewpoint compared to the viewpoints of the networked cameras 120A to 120X. The image is generated using the images captured by one or more cameras of the network 120 and the determined information reflecting atmospheric conditions of step 310.

The method 300 can be used in conjunction with a graphical user interface executed by the module 101. For example, the user selecting a virtual camera using the virtual interface may cause the image data to be captured and the resultant images to be input to the loop of step 315 to 360.

Figure 8:
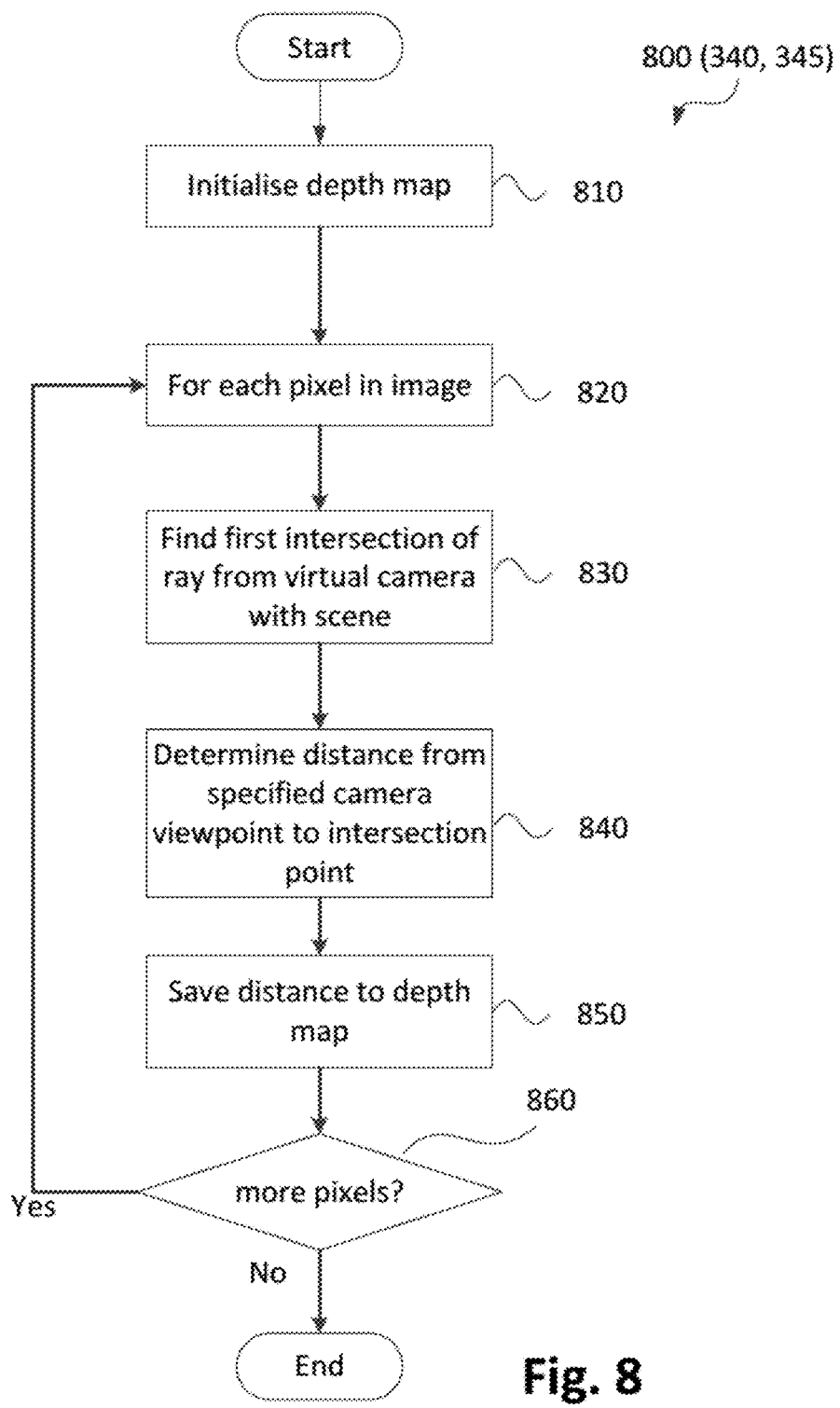
FIG. 8 is a schematic flow diagram showing a method of generating one or more depth maps.

The method 800 of generating a depth map that corresponds to the pixels of a virtual image of the scene based on a specified viewpoint and a 3D scene geometry (formed at step 330) is now described with reference to FIG. 8. The method 800 is typically implemented as one or more modules of the application 233, stored in the memory 206 and controlled tinder execution of the processor 205. The method 800 is used at step 340 to generate a virtual depth map based on the virtual viewpoint at the current frame. The method 800 is used at step 345 to generate capture depth maps based on capture camera viewpoints. The method 800 starts at step 810. Step 810 executes to initialise a depth map for the virtual camera. The depth map can be represented as an image with the same dimensions as the virtual camera capture where each pixel stores a depth value. The depth value may be stored in fixed or floating point depending on the specific memory and processing requirements. In the preferred embodiment a floating point storage is used. The depth for each pixel of the image can be determined by comparing the specified camera viewpoint location and the position of the point of the 3D geometry of the scene imaged at that pixel.

After the depth map is initialised the method 800 continues to a selecting step 820. The pixels of the depth map are set in turn in a loop operation starting at step 820 which selects the next pixel to set. The method 800 continues from step 820 to a determining step 830. Step 830 determines the first intersection of the ray from the virtual camera corresponding to the current pixel with the 3D scene geometry.

The method 800 continues from step 830 to a determining step 840. At step 840 the distance from the first intersection to the specified viewpoint (e.g. the virtual camera location or a network camera location) is determined. The method 800 continues from step 840 to a storing step 850. The distance determined at step 840 is stored at the pixel of the depth map at step 850.

Once the depth map has been updated for the current pixel, the method 800 continues to a check step 860. Step 860 executes to check if there are more pixels in the image to process. If there are more pixels ("Yes" at step 860) the method 800 returns to step 820. Otherwise the depth map is complete, step 860 returns "No" and the method 800 ends.

FIGS. 6A to C show some example depth maps that may be generated using the method 800 and as described with reference to steps 340 and 345 above. The method 800 of generating a depth map is an example. Alternative methods of determining a depth map are also known.

Figure 9:
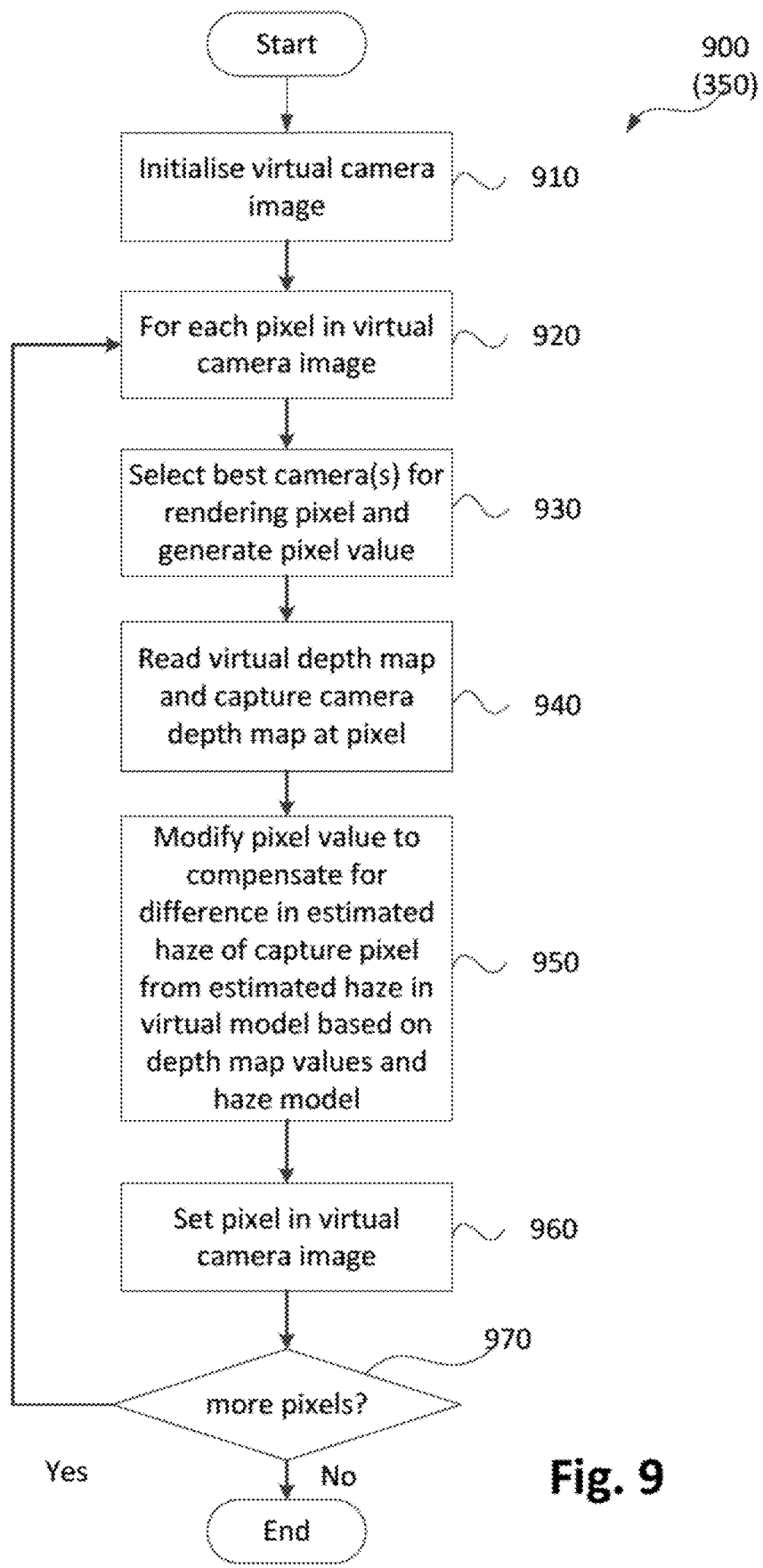
FIG. 9 is a schematic flow diagram showing a method of generating a virtual image for a virtual camera in a scene including atmospheric conditions.

The method 900 of generating a virtual or FVV image from the virtual camera viewpoint adjusted for haze, as used at step 350 above, is now described with reference to FIG. 9. The method 900 is typically implemented as one or more modules of the application 233, stored in the memory 206 and controlled under execution of the processor 205.

The method 900 renders pixels from the image data of one or more real camera captured images based on the haze model, the virtual depth map, one or more capture depth maps and the camera calibration data. The method 900 effectively involves rendering pixels from captured images onto the 3D model while compensating for the difference in distance through the haze between the captured images and the virtual image.

The method 900 begins at step 910. Step 910 executes to initialise a virtual camera image. The pixel dimensions are defined by the intrinsic parameters of the virtual camera, and may be the same or different from the pixel dimensions of the capture cameras. The stored data at each pixel may be fixed precision integer or floating point and may have multiple channels (e.g. RGB, YUV).

The method 900 continues from step 910 to a selecting step 920. Starting at step 920, the pixel value of each pixel in the virtual image is set in turn in a loop structure. Step 920 selects the next pixel location in the virtual image. The method 900 continues from step 920 to step 930. Execution of step 930 selects a camera or cameras from which to render the pixel. The selection of one or more cameras at step 930 may be based on a number of different criteria. For example, the camera may be selected based upon:

The camera for which the capture distance map is smallest (i.e. the camera that has a closest distance to the three-dimensional point in the scene that is captured at the corresponding pixel of the virtual camera).

The camera for which the direction vector from the camera to the rendered 3D scene point (capture direction vector) is closest to the direction vector from the virtual camera to the rendered 3D scene point (virtual direction vector), for example selected according to the largest dot product of normalised captured image direction vectors and virtual image direction vectors.

The camera that has the highest resolution when projected onto the 3D scene geometry at the current pixel.

A combination of the above or other factors related to visual features of the pixel in the captured and virtual images.

The pixel value from a given camera corresponding to the virtual camera pixel may be interpolated depending on the configuration and geometry. Suitable interpolation methods include cubic interpolation, linear interpolation, sine interpolation, Fourier interpolation and nearest neighbour interpolation. In some configurations it may be advantageous to select multiple cameras and the corresponding pixel values may be blended together to form an improved pixel value for rendering. However, if selecting multiple cameras the pixel values from the different cameras should typically not be blended until after the pixel values have been compensated for haze at step 950, described below. Upon completion of step 930, a pixel value with which to render the current pixel in the virtual camera image is known.

The method 900 continues from step 930 to a reading step 940. At execution of step 940 the virtual and capture depth maps are read at the current pixel. In some implementations the value from the capture depth map may already have been read at step 930, in which case indexing the depth map a second time is unnecessary.

The method 900 continues from step 940 to the step 950. At step 950 the pixel value from step 930 is modified to compensate for the difference in haze affecting the captured pixel, compared with the haze expected to affect the virtual camera image according to the virtual depth maps. The compensation may take place in two sub-steps or may be performed in a single step. Implementing the compensation in two steps relates to firstly removing all haze according to the capture depth map data, followed by adding simulated haze according to the virtual depth map data. Accordingly, atmospheric conditions are removed according to the depth maps of the captured images, and atmospheric conditions are added according to the depth map of the image captured by the virtual camera using the model of atmospheric conditions. Implementing the compensation in a single step relates to removing only the excess amount of haze, or adding only the missing amount of haze based on whether the virtual camera viewpoint includes less or more haze respectively.

After compensation the method 900 continues to a setting step 960. The compensated pixel value is used to set the virtual camera image pixel at step 960.

The method 900 continues from step 960 to a check step 970. Execution of step 970 checks if there are more pixels to process. The method 900 returns to step 920 if there are more pixels ("Yes" at step 970). Otherwise, step 970 returns "No" and the method 900 ends. The described method of generating a virtual image by looping through pixels provides an example of how each pixel can be determined.

As described above, the method 900 relates to increasing or decreasing visibility of objects in the virtual camera viewpoint compared to the captured images based on the model of atmospheric conditions. The visibility is affected by adjusting the amount of haze (or other atmospheric conditions) based on the model of the scene and the model of step 310. For example, a virtual camera viewpoint that is zoomed-in compared to the physical cameras will typically be less subject to haze and objects in the virtual viewpoint can have increased visibility. The resultant visibility is accordingly also determined based on the three-dimensional model of the scene of step 330. Conversely, a virtual camera viewpoint that is zoomed-out compared to the physical cameras will typically be more subject to haze and objects in the virtual viewpoint can have decreased visibility.

Figure 10:
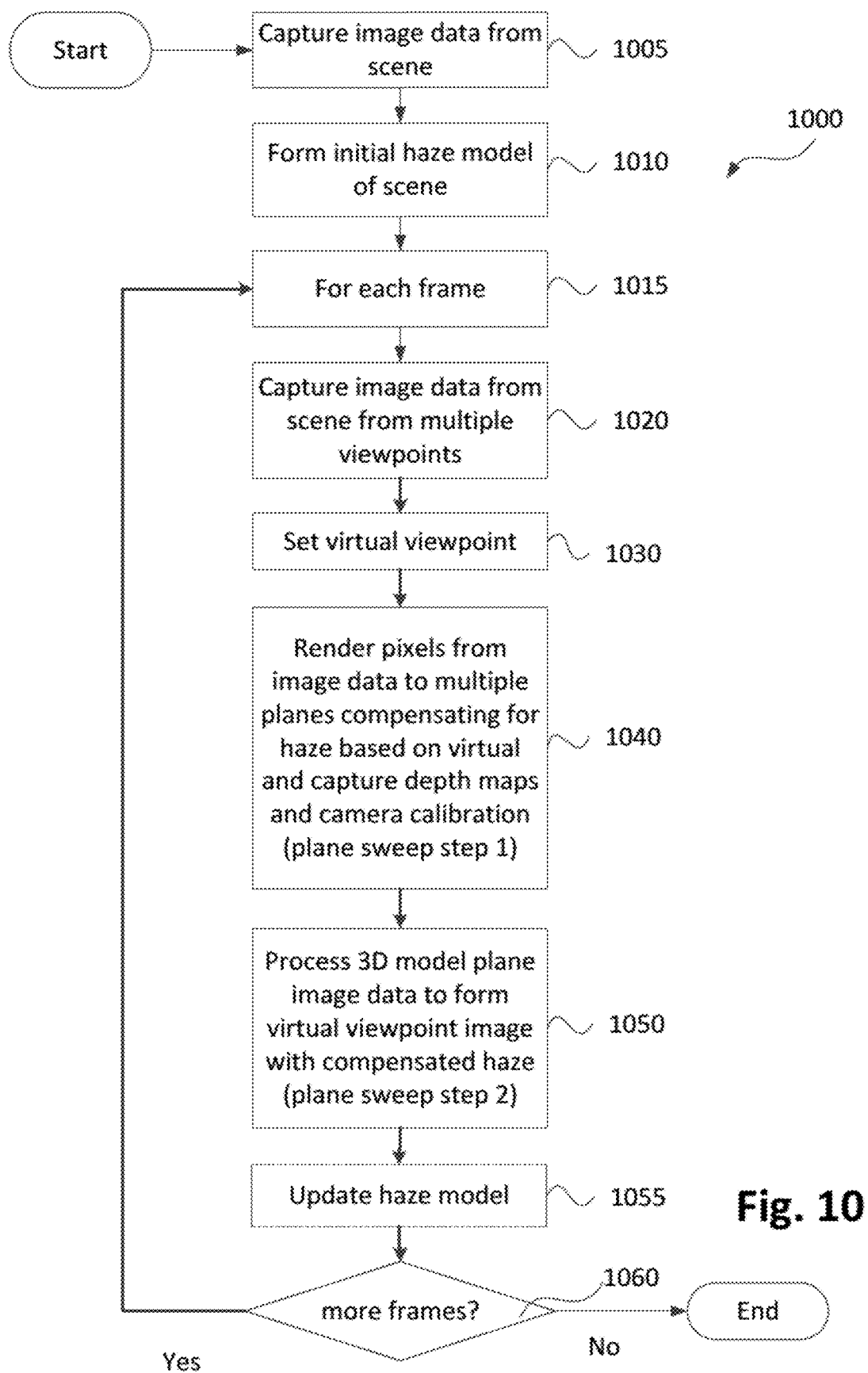
FIG. 10 is a schematic flow diagram showing an alternative method of generating free viewpoint video of a scene in the presence of atmospheric conditions using images captured from multiple viewpoints.

An alternative method 1000 of generating free viewpoint video of an event affected by atmospheric conditions such as fog, haze, mist or smoke for a calibrated network of cameras 120A-X is now described with reference to FIG. 10. The method 1000 is typically implemented as one or more modules of the application 233, stored in the memory 206 and controlled under execution of the processor 205.

The method 1000 is illustrated through examples from FIGS. 4 to 7 described above. While method 300 is suitable for FVV generation based on reconstruction of 3D geometry and could be adapted to depth based rendering, method 1000 is based on an image-based method. In particular, the method 1000 applies to a plane sweep method however the techniques described could be adapted to other image-based methods.

The method 1000 begins at step 1005. At step 1005 a set of image data is captured for the scene, for example the area 110. The image data can be captured by one camera, by a subset of cameras, or by the entire network of cameras 120A-X. The determination of which cameras to capture images from may be made based on user input or automatically, and may be transmitted from the controller to the camera network. Preferably full camera images are captured. The full images can may be compressed or downsampled relative to the full resolution of the camera network to reduce network traffic in transmitting the image data from the cameras to the processing unit 105. In some embodiments the image data may consist of a fraction of the full image capture covered by each camera.

The method 1000 from continues from step 1005 to a forming step 1010. At step 1010 the controller (user) requests an initial model of the haze to be formed based on the captured image data as discussed with respect to step 310 of method 300. Upon forming the haze model, the method 1000 continues to a selecting step 1050. Starting at step 1015, FVV is generated for multiple frames captured by the camera network using a looping structure. The arrangements described are based on an assumption that the cameras 120N-120X are synchronised in time such that each frame is sampled by each camera at or near the same time. This may be achieved using genlock or some other synchronisation technique. The step 1015 operates to select a frame of the image data.

The method 1000 continues from step 1015 to a capturing step 1020. At step 1020, image data for a set of cameras is read out and transmitted around the network 120 to the processing unit 205 according to the step 320 of method 300. The method 1000 continues from step 1020 to a setting step 1030. At step 1030 a virtual viewpoint for the current frame is set according to the same method as step 335 of method 300.

The method 1000 continues from step 1030 to a rendering step 1040. At step 1040 a set of at least two captured images are selected and rendered onto a number of three-dimensional geometry planes that are determined based on the virtual viewpoint of the scene selected at step 1030. The geometry planes effectively provide models of the scene. The captured images may be selected as those images closest to the virtual camera in terms of the optical axis of the physical cameras or based on some other criteria related to geometry, image quality and the like.

The rendered planes are similar to planes generated for existing plane sweep FVV generation methods but with a difference that confers the advantage of handling the haze in the scene. Existing plane sweep methods render the captured images directly to the planes, effectively forming models of the scene. In contrast, the arrangements described modify each captured image pixel to compensate for the difference in expected haze affecting the virtual camera capturing image content at a given plane compared to the expected haze in the real camera capturing the pixel corresponding to the same point on the same plane. Each point in each plane will typically need to be compensated in a unique way.

For each image plane and each camera, the step 1040 can be performed by setting the 3D model to the plane geometry and generating a virtual depth map and a capture depth map for the planar 3D model. Step 1040 may be performed according to the same methods described with reference to steps 340 and 345 for the 3D planar model, and creating a virtual image for that planar model with realistic haze according to step 350. The result of execution of step 1040 is a set of multiple captured image renderings at each plane, each of which has been compensated for haze according to a 3D planar model and a haze model.

The method 1000 continues from step 1040 to a generating step 1050. At step 1050 a virtual or FVV image from the virtual camera is generated with haze by processing the set of plane images for each plane and each captured image. Step 1050 may be performed based on a number of relatively simple heuristics such as testing the consistency of projected images for each plane and selecting a suitable plane at each pixel, for example based upon a match score. Alternatively step 1050 may use more complicated heuristics or machine learning techniques (e.g. deep learning or convolutional neural network (CNN)). A number of suitable methods are known for step 1050. Step 1050 effectively renders the scene from a viewpoint of the virtual camera by adjusting pixels of the captured images corresponding to the viewpoint. The adjusting based on a three-dimensional model of the scene (a plane), locations of the plurality of cameras relative to the scene, the viewpoint of the virtual camera, and the geometric model of atmospheric conditions of step 1010.

The method 1000 differs from the method in a number of ways. In particular, the method 1000 differs in relation to use of a three-dimensional model of scene. As described above, the method 300 operates to use a three-dimensional model of the scene (for example generated during operation of the loop 315 to 360). In contrast, the method 1000 operates to use the plane sweep steps described above, effectively using a number of models of the scene and to compensate for haze or other atmospheric conditions.

The method 1050 continues from step 1050 to an updating step 1055. At step 1055 the haze model formed at step 1010 can updated based on the current, or recent frame image data. This updating may be performed on a separate processor and may take multiple frames to complete. The updating may use the techniques described above for step 1010 with updated captured images to form a new model. The new model may be used to replace the current model or may be blended with parameters from the updated model to form a more stable model over time. In some implementations, the step 1055 may be omitted, or may be implemented intermittently, for example after a certain number of iterations, at a given time interval, or based on a level of change of parameters. For example the haze model may be updated every second, or at some other update rate dependent on the type of fog, the weather conditions (such as wind speed) or the like.

The method 1000 continues from step 1055 to a check step 1060. Step 1060 checks if there are more frames to process. If there are more frames ("Yes" at step 1060) the method 1000 returns to step 1015. Otherwise step 1060 returns "No", the generated frames are used to reproduce video footage for the viewer and the method 1000 ends.

INDUSTRIAL APPLICABILITY

The arrangements described are applicable to the computer and data processing industries and particularly for image processing.

In using an initial haze (atmospheric condition) model and models reflecting the captured images and the virtual camera viewpoint, the methods described allow free viewpoint video to be synthesized for reproduction (for example on the display 214) to include atmospheric conditions. As pixels reflecting the atmospheric conditions are compensated based on differences between the cameras capturing images and the virtual camera, the atmospheric conditions are typically synthesized to be visually more realistic than without the method described. Atmospheric conditions present a technical challenge for free viewpoint video as the visual effect of object can vary with viewpoint. Accordingly, the claimed invention provides a technical solution to the problem of how to more accurately generate free viewpoint video for scenes in which atmospheric conditions are present.

The foregoing describes only some embodiments of the present invention, and modifications and/or changes can be made thereto without departing from the scope and spirit of the invention, the embodiments being illustrative and not restrictive.

The invention claimed is:

1. A method comprising:
   obtaining captured images of a scene captured with a plurality of image capturing apparatuses;
   determining, using the captured images, haze conditions in the scene, wherein the haze conditions represent a degree of haze at each of a plurality of three-dimensional positions in the scene;
   specifying a virtual viewpoint relative to the scene; and
   rendering a virtual viewpoint image representing the scene viewed from the virtual viewpoint using the captured images, the rendering based on a three-dimensional model of the scene, locations of the plurality of image capturing apparatuses relative to the scene, the virtual viewpoint, and the haze conditions.

2. The method according to claim 1, further comprising generating the three-dimensional model of the scene using the captured images.

3. The method according to claim 1, wherein the three-dimensional model comprises a number of three-dimensional geometry planes determined based on the virtual viewpoint of the scene.

4. The method according to claim 1, wherein the rendering comprises removing haze effect according to a depth map of the captured image, and adding haze effect according to a depth map of an image captured from the virtual viewpoint using the haze conditions.

5. The method according to claim 1, wherein the rendering comprises removing haze effect based on the virtual viewpoint including less haze effect than the captured images.

6. The method according to claim 1, wherein the rendering comprises adding haze effect based on the virtual viewpoint including greater haze effect than the captured images.

7. The method according to claim 1, wherein the rendering comprises decreasing visibility of an object in the rendered image compared to the captured images based on the haze conditions.

8. The method according to claim 1, wherein the rendering comprises increasing visibility of an object in the rendered image due to haze effect compared to the captured images based on the haze conditions and the three-dimensional model of the scene.

9. The method according to claim 1, wherein each pixel of the rendered image is determined from an image captured by one of the plurality of image capturing apparatuses.

10. The method according to claim 1, wherein a pixel of the rendered image is determined from an image captured by one the plurality of image capturing apparatuses having a closest distance to a point in the scene captured from the virtual viewpoint.

11. The method according to claim 1, wherein a pixel of the rendered image is determined from the captured images according to a largest dot product of normalised direction vectors of the image capturing apparatuses capturing the scene and the virtual viewpoint.

12. The method according to claim 1, wherein a pixel of the rendered image is determined from one of the captured images based on one of the plurality of image capturing apparatuses that has a highest resolution when projected onto the three-dimensional model of the scene.

13. The method according to claim 1 wherein visibility of an object in the virtual viewpoint image is modified to compensate for haze effect using the haze conditions.

14. The method according to claim 1, wherein the haze conditions relates to one of fog, haze, mist cloud, rain, smoke, haar and smog.

15. The method according to claim 1, wherein the rendering comprises:
   determining haze effect on the virtual viewpoint image according to degrees of haze at respective three-dimensional positions between an object in the scene and the virtual viewpoint.

16. A method comprising:
   inputting a plurality of captured images of a same scene captured with a plurality of image capturing apparatuses having multiple viewpoints, the scene including objects, wherein haze of the scene affect visibility of each object in the scene;
   determining information related to the visibility of the objects due to the haze effect, wherein the information represent a degree of haze at each of a plurality of three-dimensional positions in the scene; and
   generating a virtual viewpoint image representing the scene viewed from a virtual viewpoint, the virtual viewpoint being a zoomed-in viewpoint compared to the multiple viewpoints, the virtual viewpoint image being generated using the captured images and the determined information, the generated image having increased visibility for the objects compared to the plurality of captured images.

17. The method according to claim 16, wherein the virtual viewpoint image is generated by adjusting pixels of the captured images corresponding to the virtual viewpoint, the adjusting based on a three-dimensional model of the scene, locations of the image capturing apparatuses, and the determined information.

18. A non-transitory computer readable medium having a computer program stored thereon to implement a method comprising:
   obtaining captured images of a scene captured with a plurality of image capturing apparatuses;
   determining, using the captured images, haze conditions in the scene, wherein the haze conditions represent a degree of haze at each of a plurality of three-dimensional positions in the scene;
   specifying a virtual viewpoint relative to the scene; and
   rendering a virtual viewpoint image representing the scene viewed from a the virtual viewpoint using the captured images, the rendering based on a three-dimensional model of the scene, locations of the plurality of image capturing apparatuses relative to the scene, the virtual viewpoint, and the haze conditions.

19. A system, comprising:
   a plurality of image capturing apparatuses positioned to capture images of a scene;
   one or more memories; and one or more processors, wherein the one or more processors is configured to execute instructions stored on the one or more memories for implementing a method comprising:

obtaining captured images of the scene captured with the plurality of image capturing apparatuses;

determining, using the captured images, haze conditions in the scene, wherein the haze conditions represent a degree of haze at each of a plurality of three-dimensional positions in the scene;

specifying a virtual viewpoint relative to the scene; and rendering a virtual viewpoint image representing the scene viewed from the virtual viewpoint using the captured images, the rendering based on a three-dimensional model of the scene, locations of the plurality of image capturing apparatuses relative to the scene, the virtual viewpoint, and the haze conditions.

20. Apparatus comprising:

one or more memories;

one or more processors configured to execute instructions stored on the memory implement a method comprising:

obtaining captured images of a scene captured with a plurality of image capturing apparatuses;

determining, using the captured images, haze conditions in the scene, wherein the haze conditions represent a degree of haze at each of a plurality of three-dimensional positions in the scene;

specifying a virtual viewpoint relative to the scene; and rendering a virtual viewpoint image representing the scene viewed from the virtual viewpoint using the captured images, the rendering based on a three-dimensional model of the scene, locations of the plurality of image capturing apparatuses relative to the scene, the virtual viewpoint, and the haze conditions.

* * * * *